(12) United States Patent
Abe

(10) Patent No.: US 9,150,144 B2
(45) Date of Patent: Oct. 6, 2015

(54) VEHICLE HEADLAMP

(71) Applicant: ICHIKOH INDUSTRIES, LTD., Isehara-shi, Kanagawa-ken (JP)

(72) Inventor: Toshiya Abe, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 288 days.

(21) Appl. No.: 13/720,305

(22) Filed: Dec. 19, 2012

(65) Prior Publication Data

US 2013/0163269 A1 Jun. 27, 2013

(30) Foreign Application Priority Data

Dec. 27, 2011 (JP) ................. 2011-286657

(51) Int. Cl.
*B60Q 1/04* (2006.01)
*F21S 8/10* (2006.01)
(52) U.S. Cl.
CPC ............... *B60Q 1/04* (2013.01); *F21S 48/1154* (2013.01); *F21S 48/1258* (2013.01); *F21S 48/1778* (2013.01); *F21S 48/321* (2013.01)
(58) Field of Classification Search
CPC .... B60Q 1/04; F21S 48/1778; F21S 48/1154; F21S 48/321; F21S 48/1258; F21S 48/14; F21S 48/1768; F21S 48/1784; F21S 48/1789; F21V 13/10; F21V 11/183

USPC ......... 362/539, 464, 465, 469, 467, 468, 487, 362/507, 509, 512, 513, 520, 460, 277–284
See application file for complete search history.

(56) References Cited

U.S. PATENT DOCUMENTS

| 8,348,487 B2 * | 1/2013 | Chen ............................ 362/539 |
| 8,684,572 B2 * | 4/2014 | Weber .......................... 362/507 |
| 2012/0008335 A1 * | 1/2012 | Yamamoto .................... 362/539 |

FOREIGN PATENT DOCUMENTS

JP 2011-113732 A 6/2011

* cited by examiner

*Primary Examiner* — Diane Lee
*Assistant Examiner* — Naomi M Wolford
(74) *Attorney, Agent, or Firm* — Foley & Lardner LLP

(57) ABSTRACT

The present invention provides a semiconductor-type light source 2, a lens 35, a heat sink member 4, a light control member 6, a driving member 7, and a cover member 8. The cover member 8 is fixed to a fixing surface of the heat sink member 4 such a manner as to be integrated with the semiconductor-type light source 2. The light control member 6 is mounted to the cover member 8 in such a manner as to be changeably movable between a first location and a second location. As a result, the present invention is capable of reducing dispersion in relative position between the semiconductor-type light source 2 and the light control member 6, and reducing dispersion between a light distribution pattern for low beam LP and a light distribution pattern for high beam HP.

6 Claims, 18 Drawing Sheets

(A)

(B)

(A)

(B)

(C)

(A)

(B)

VEHICLE HEADLAMP

CROSS REFERENCE TO RELATED APPLICATIONS

This application claims priority of Japanese Patent Application No. 2011-286657 filed on Dec. 27, 2011. The contents of the application are incorporated herein by reference in their entirety.

BACKGROUND OF THE INVENTION

1. Field of the Invention

The present invention relates to a vehicle headlamp that is capable of causing light from a semiconductor-type light source to be incident to a lens, illuminating the incident light from the lens forward of a vehicle, as a predetermined light distribution pattern, and switching the light distribution pattern.

2. Description of the Related Art

A vehicle headlamp of such type is conventionally known (for example, Japanese Unexamined Patent Application Publication No. 2011-113732). Hereinafter, the conventional vehicle headlamp will be described.

A conventional vehicle headlamp is provided with: a light source; a lens; a first reflection surface configured to rotate around a rotary shaft; and a second reflection surface. In addition, the conventional vehicle headlamp is provided in such a manner that when the first reflection surface rotates and is positioned in a released location, light from the light source is transmitted through the lens, and the transmitted light is illuminated forward of a vehicle, as a light distribution pattern for passing beam. Alternatively, when the first reflection surface rotates and is positioned in a light shading location, the light from the light source is reflected on the first reflection surface, the reflected light is reflected on the second reflection surface and then the thus reflected light is illuminated forward of the vehicle, as a light distribution pattern for cruising beam.

In such a vehicle headlamp, it is important to reduce dispersion in relative position between a semiconductor-type light source and a light control member and then reduce dispersion in light distribution pattern. However, in the conventional vehicle headlamp, no consideration has been taken as to means for reducing dispersion in relative position between the light source (the semiconductor-type light source) and the first reflection surface and the second reflection surface (the light control member).

SUMMARY OF THE INVENTION

The present invention has been made in order to solve the above described problem that it is important to reduce the dispersion in relative position between the semiconductor-type light source and the light control member and then reduce the dispersion in light distribution pattern.

A vehicle headlamp according to a first aspect of the present invention comprising:

a semiconductor-type light source having a light emission surface;

a lens configured to illuminate light from the light emission surface of the semiconductor-type light source forward of a vehicle, as a predetermined pattern;

a mount member to which the semiconductor-type light source is fixed;

a light control member that is disposed so as to be movable between a first location and a second location, and is configured to switch the light distribution pattern;

a driving member configured to position the light control member so as to be changeably movable between the first location and the second location; and a cover member in which a window portion is provided in correspondence with the light emission surface of the semiconductor-type light source, the cover member being configured to cover a portion other than the light emission surface of the semiconductor-type light source, wherein the cover member is fixed to the mount member so as to be integrated with the semiconductor-type light source, and wherein the light control member is mounted to the cover member so as to be changeably movable between the first location and the second location.

The vehicle headlamp according to a second aspect of the present invention, in the first aspect, wherein the light control member is mounted to the cover member so as to be changeably rotatable and movable between the first location and the second location by a rotation mechanism, and wherein a rotation center shaft of the rotation mechanism is positioned on an opposite side of the lens with respect to the semiconductor-type light source that is fixed to the mount member.

The vehicle headlamp according to third aspect of the present invention, in the first aspect, wherein the light control member is mounted to the cover member so as to be changeably slidably movable between the first location and the second location by means of a slide mechanism and a guide protrusive portion, wherein the guide protrusive portion is positioned on an opposite side of the lens with respect to the semiconductor-type light source that is fixed to the mount member.

The vehicle headlamp according to the first aspect of the present invention is provided in such a manner that a cover member is fixed to a mount member so as to be integrated with a semiconductor-type light source, and to the cover member, a light control member is mounted so as to be changeably movable between a first location and a second location. As a result, dispersion in relative position between the semiconductor-type light source and the light control member can be reduced. In this manner, dispersion in light distribution pattern can be reduced, making it possible to contribute to safe driving. In addition, a dimensional tolerance between the semiconductor-type light source and the light control member can be mitigated, its related manufacturing efficiency is improved, and its related manufacturing costs can be reduced accordingly.

The vehicle headlamp according to the second aspect of the present invention is provided in such a manner that a rotation center shaft of a rotation mechanism is positioned on an opposite side of a lens with respect to a semiconductor-type light source that is fixed to a mount member. As a result, a light control member can be switched in such a manner as to be rotationally moved between a first location with a narrow gap and a second location with a narrow gap. In this manner, dimensions in rotation movement switching direction between the first location and the second location of a lamp unit can be reduced, and the lamp unit can be reduced in size accordingly.

The vehicle headlamp according to the third aspect of the present invention is provided in such a manner that a guide protrusive portion is positioned on an opposite side of a lens with respect to a semiconductor-type light source that is fixed to a mount member. As a result, a light control member can be slidably moved and switched between a first location with a narrow gap and a second location with a narrow gap. In this manner, dimensions in slide movement switching direction between the first location and the second location of a lamp unit can be reduced, and the lamp unit can be reduced in size accordingly.

DESCRIPTION OF THE PREFERRED EMBODIMENTS

Figure 21:
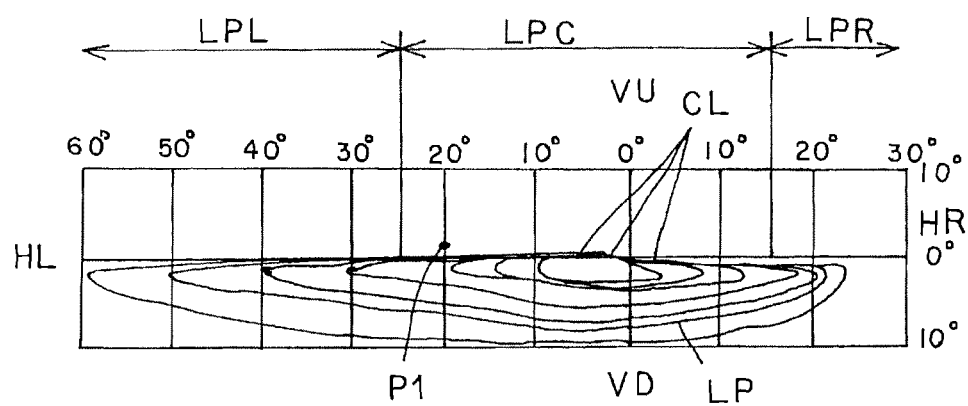
FIG. 21 is an explanatory view showing a light distribution pattern for low beam and a light distribution pattern for high beam that are illuminated from a left side lamp unit.
Figure 21:
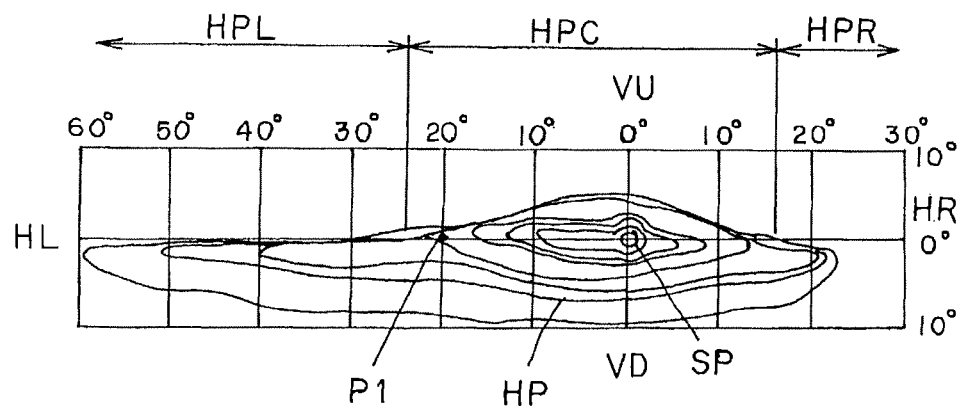
Figure 22:
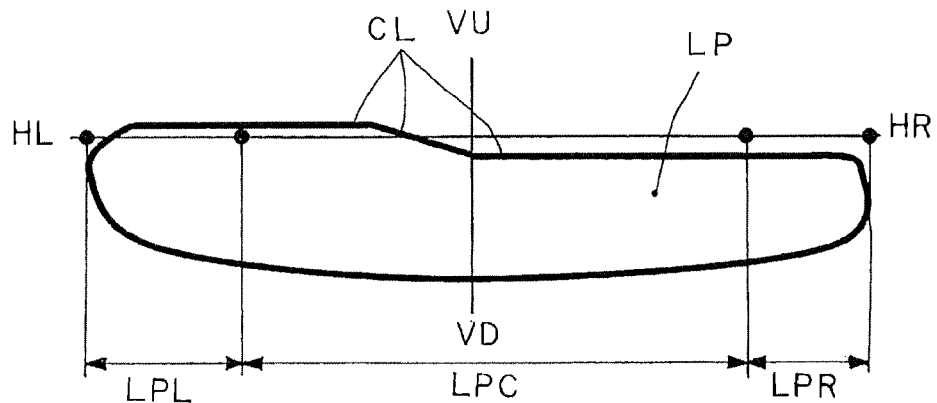
FIG. 22 is an explanatory view showing a light distribution pattern for low beam and a light distribution pattern for high beam that are respectively emitted and combined (weighted) from both of the left side lamp unit and the right side lamp unit.
Figure 22:
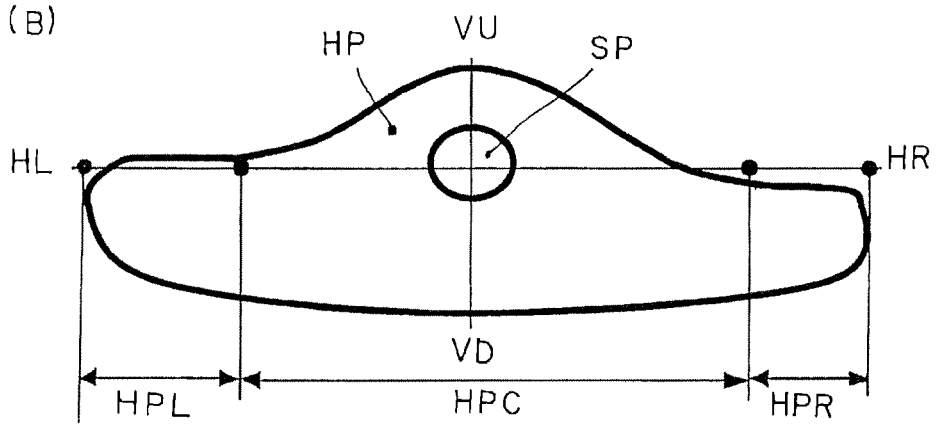
Figure 22:
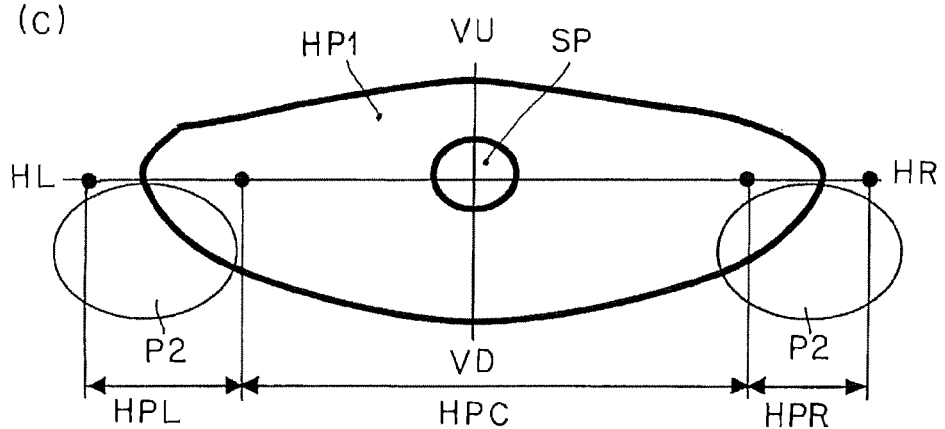

Hereinafter, a three of the preferred embodiment (exemplary embodiment) of vehicle headlamps according to the present invention will be described in detail with reference to the drawings. It is to be noted that the present invention is limited by the embodiment. In FIG. 21, FIG. 22, reference code VD-VD designates a vertical line from the top and bottom of a screen. Reference code HL-HR designates a horizontal line from the left and right of the screen. In addition, FIG. 21 is explanatory view of an equi-intensity curve schematically depicting a light distribution pattern on a screen graphically depicted by means of computer simulation. In the explanatory view of the equi-intensity curve, a central equi-intensity curve designates a high intensity, and an outside equi-intensity curve designates a low intensity. Further, in FIG. 10 and FIG. 11, hatching of a cross section of a lens is not shown. In the present specification, the terms "front, rear, top, bottom, left, and right" designate the front, rear, top, bottom, left, and right when the vehicle headlamp according to the present invention is mounted on a vehicle.

(Description of Configuration in First Embodiment)

Figure 1:
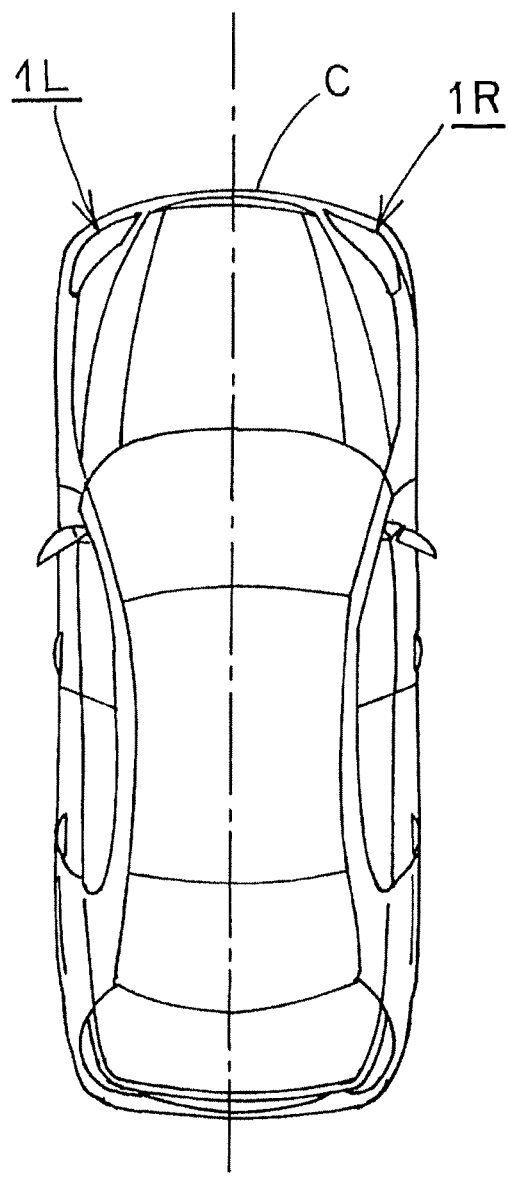
FIG. 1 shows a first embodiment of a vehicle headlamp according to the present invention, and is a plan view of a vehicle on which vehicle headlamps on both of the left and right sides are mounted.
Figure 2:
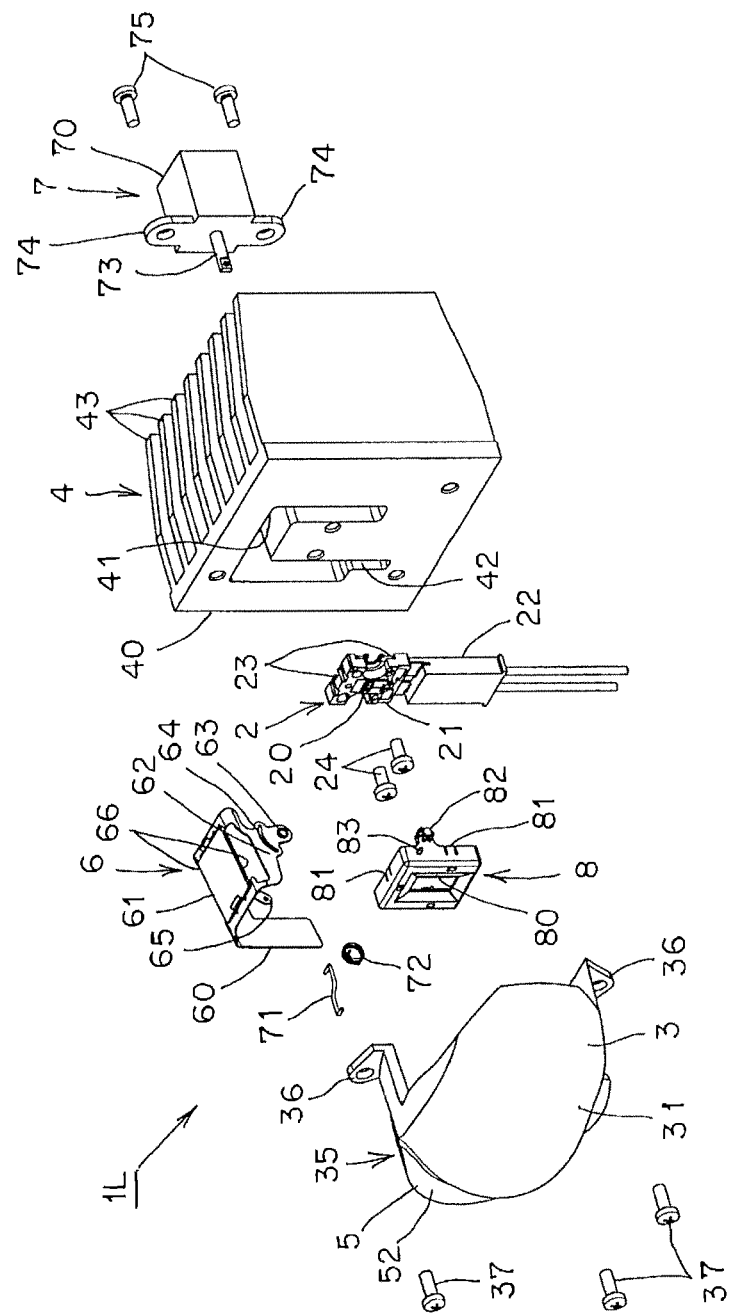
FIG. 2 is an exploded perspective view showing essential constituent elements of a left side lamp unit.
Figure 3:
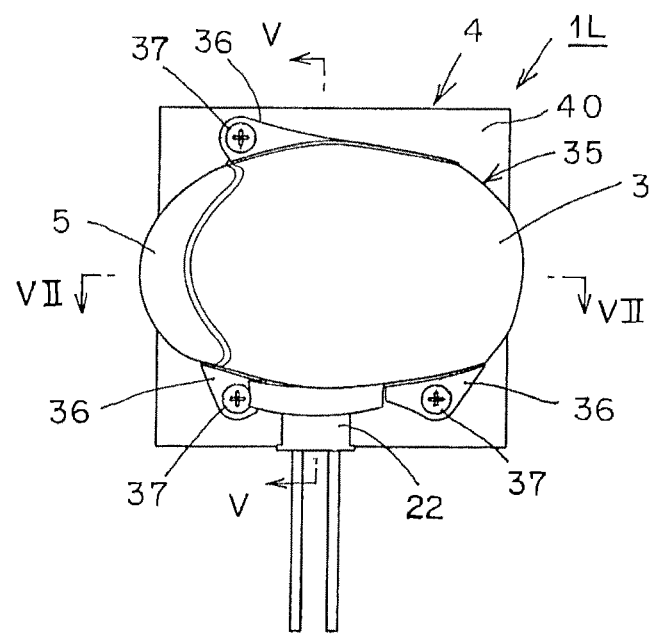
FIG. 3 is a front view showing the left side lamp unit.
Figure 4:
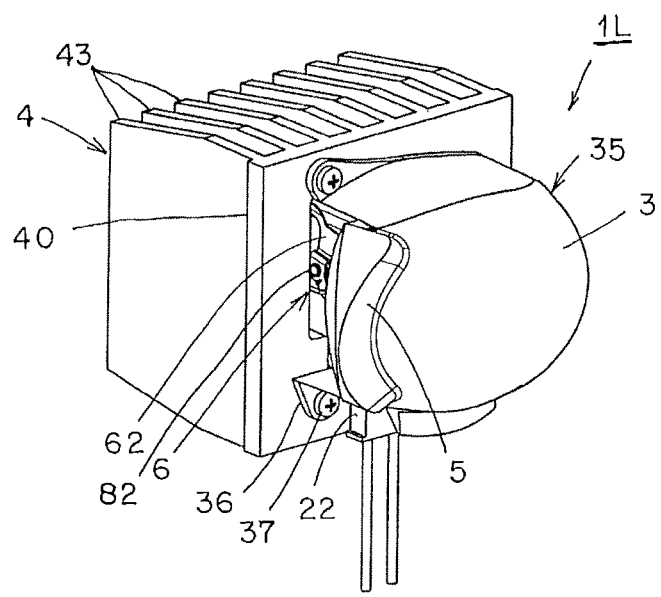
FIG. 4 is a perspective view showing the left side lamp unit.

FIG. 1 to FIG. 23 each shows a first embodiment of a vehicle headlamp according to the present invention. Hereinafter, a configuration of the vehicle headlamp according to the embodiment will be described. In FIG. 1, reference codes 1L and 1R designate vehicle headlamps according to the embodiment (such as headlamps, for example). The vehicle headlamps 1L and 1R are mounted at both of the left and right end part of a front part of a vehicle C. Hereinafter, the left side vehicle headlamp 1L that is mounted on the left side of the vehicle C will be described. It is to be noted that the right side vehicle headlamp 1R that is mounted on the right side of the vehicle C forms a construction that is substantially identical to that of the left side vehicle headlamp 1L; and therefore, a duplicate description is not given.

(Description of Lamp Unit)

The vehicle headlamp 1L, as shown in FIG. 2 to FIG. 8, is provided with: a lamp housing (not shown); a lamp lens (not shown); a semiconductor-type light source 2; a lens 35; a mount member 4 that is compatible with a heat sink (hereinafter, refer to as a "heat sink member"); a light control member (a movable optical part) 6; a driving member 7; and a cover member 8.

The semiconductor-type light source 2, the lens 35, the heat sink member 4, the light control member 6, the driving member 7, and the cover member 8 configure a lamp unit. The lamp housing and the lamp lens define a lamp room (not shown). The lamp unit that is made of the constituent elements that are designated by reference numerals 2, 35, 4, 6, 7, and 8 are disposed in the lamp room, and is mounted to the lamp housing via an optical axis adjustment mechanism for vertical direction (not shown) and an optical axis adjustment mechanism for transverse direction (not shown).

(Description of Semiconductor-type Light Source 2)

The semiconductor-type light source 2 is a self-emitting light semiconductor-type light source such as an LED, an EL (an organic EL), for example, in this example, as shown in FIG. 2, FIG. 5 to FIG. 9, FIG. 11 to FIG. 13, FIG. 17, FIG. 19, FIG. 20 and FIG. 23. The semiconductor-type light source 2 is made of: a light emitting chip (an LED chip) 20; a package (an LED package) that is configured to seal the light emitting chip 20 with a sealing resin member; a board 21 that is configured to mount the package; and a connector 22 that is mounted on the board 21, and that is configured to supply a current from a power source (a battery) to the light emitting chip 20. It is to be noted that in FIG. 19 and FIG. 20, the connector 22 is not shown. Among vertical and transverse four sides of the board 21, at least three sites that constitutes top and left and right sides are those in which engagement portions 23 are provided. The board 21 is fixed to the heat sink member 4 by means of a screw 24. As a result, the semiconductor-type light source 2 is fixed to the heat sink member 4.

Figure 12:
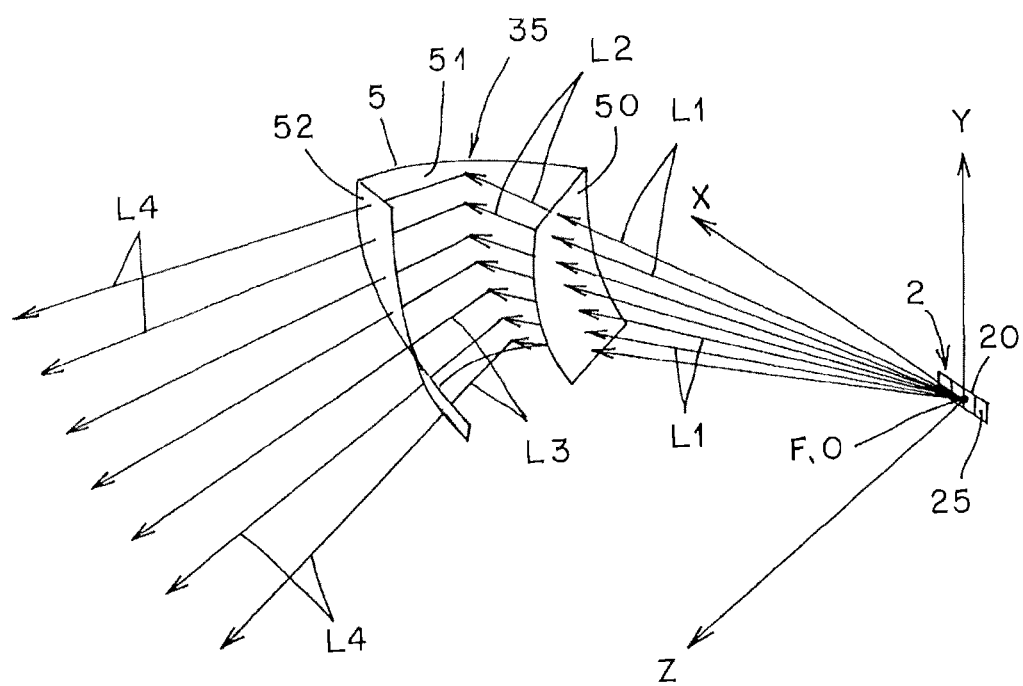
FIG. 12 is a perspective explanatory view showing the optical path of the auxiliary lens portion of the lens.
Figure 13:
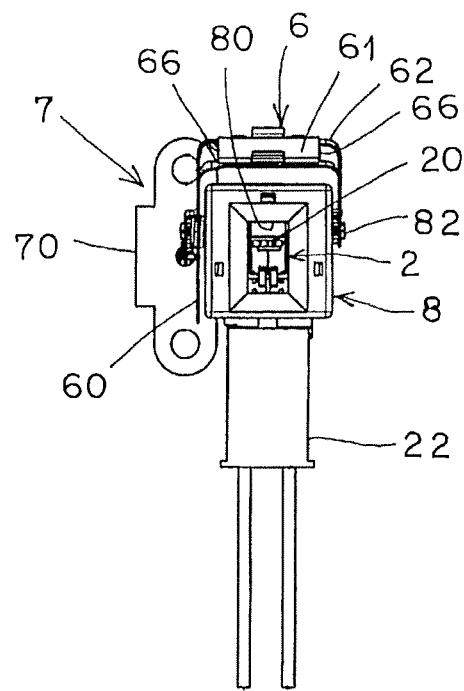
FIG. 13 is a front view showing a semiconductor-type light source, a light control member, a driving member, and a cover member when the light control member is positioned in the first location.
Figure 14:
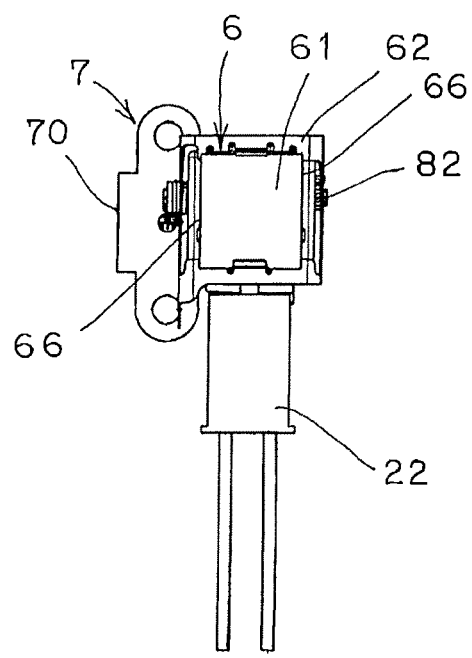
FIG. 14 is a front view showing the semiconductor-type light source, the light control member, the driving member, and the cover member when the light control member is positioned in the second location.

The light emitting chip 20 is formed in a planar rectangular shape (a flat surface elongated shape) as shown in FIG. 12. In other words, four square chips are arranged in an X axis direction (a horizontal direction). It is to be noted that two, three, or five or more square chips or one elongated chip, or one square chip may be used. A front face of the lens, in this example, a front face of an elongated shape forms a light emission surface 25. The light emission surface 25 is oriented to a front side of a reference optical axis (a reference axis) Z of the lens 35. A center O of the light emission surface 25 of the light emitting chip 20 is positioned at or near a reference focal point F of the lens 35, and is positioned on or near a reference optical axis Z of the lens 35.

In FIG. 12, the X, Y, and Z axes configure a quadrature coordinate (an X-Y-Z quadrature coordinate system). The X axis designates a horizontal axis in a transverse direction passing through the center O of the light emission surface 25 of the light emitting chip 20, and inside of the vehicle C, in other words, in the first embodiment, the right side designates a positive direction, and the left side designates a negative direction. In addition, the Y axis designates a vertical axis in a vertical direction passing through the center O of the light emission surface 25 of the light emitting chip 20, and in the first embodiment, the upper side designates a positive direction, and the lower side designates a negative direction. Further, the Z axis designates a normal line (a perpendicular line) passing through the center O of the light emission surface 25 of the light emitting chip 20, in other words, an axis in a forward/backward direction that is orthogonal to the X axis and the Y axis, and in the first embodiment, the front side designates a positive direction, and the rear side designates a negative direction.

(Description of Cover Member 8)

Figure 23:
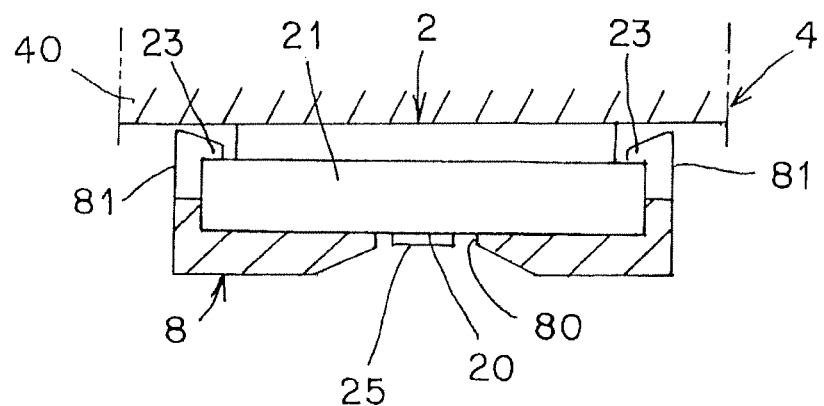
FIG. 23 is a partially sectional explanatory view showing a state in which a semiconductor-type light source and a cover member are integrally assembled.

The cover member 8 is formed in the shape of an elongated cover in a front view, the elongated cover having a window portion 80 at its center part, as shown in FIG. 2, FIG. 5 to FIG. 7, FIG. 13, and FIG. 15 to FIG. 18, and FIG. 23. The cover member 8 is made of a light impermeable member, for example. Elastic engagement claws 81 are integrally provided at the three sites that constitute the top and left and right sides of the cover member 8. The elastic engagement claw 81 is, as shown in FIG. 23 elastically engaged with the engagement portion 23. As a result, the cover member 8 is integrally fixed to the semiconductor-type light source 2.

The window portion 80 of the cover member 8 is positioned in correspondence with the light emission surface 25 of the light emitting chip 20 of the semiconductor-type light source 2. At least one portion other than the window portion 80 of the cover member 8 covers the periphery of the light emitting chip 20 of a front face of the board 21 of the semiconductor-type light source 2. As a result, the light that is radiated from the light emission surface 25 of the light emitting chip 20 of the semiconductor-type light source 2 can be caused to be incident to the side of the lens 35 without being shaded by means of a portion other than the window portion 80 of the cover member 8, through the window portion 80 of the cover member 8. In addition, of the front face of the board 21 of the semiconductor-type light source 2, the periphery of the light emitting chip 20 is covered with the at least one portion other than the window portion 80 of the cover member 8. As a result, its related appearance is improved.

On both of the left and right sides of the cover member 8, circular axes 82 of the rotation mechanism are integrally provided in such a manner as to be parallel to or is substantially parallel to the X axis direction. At least on either one of the left and right sides of the cover member 8 (on the left side in this example) and in proximal to the axes 82, pins 83 are integrally provided in such a manner as to be parallel to or is substantially parallel to the X axis direction.

(Description of Lens 35)

The lens 35 is made of: a main lens portion 3; an auxiliary lens portion 5; and a plurality of, in this example, three fixing leg portions 36, as shown in FIG. 2 to FIG. 12. It is to be noted that the double dotted chain line in FIG. 10 and FIG. 11 designates a boundary between the main lens portion 3 and the auxiliary lens portion 5. The fixing leg portions 36 are fixed to the heat sink member 4 by means of a screw 37. As a result, the lens 35 is fixed to the heat sink member 4. The fixing leg portion 36 is structured in such a manner as to be integrated with the lens 35 in this example, whereas this fixing leg portion may be structured in such a manner as to be separated from the lens 35.

(Description of Main Lens Portion 3)

Figure 11:
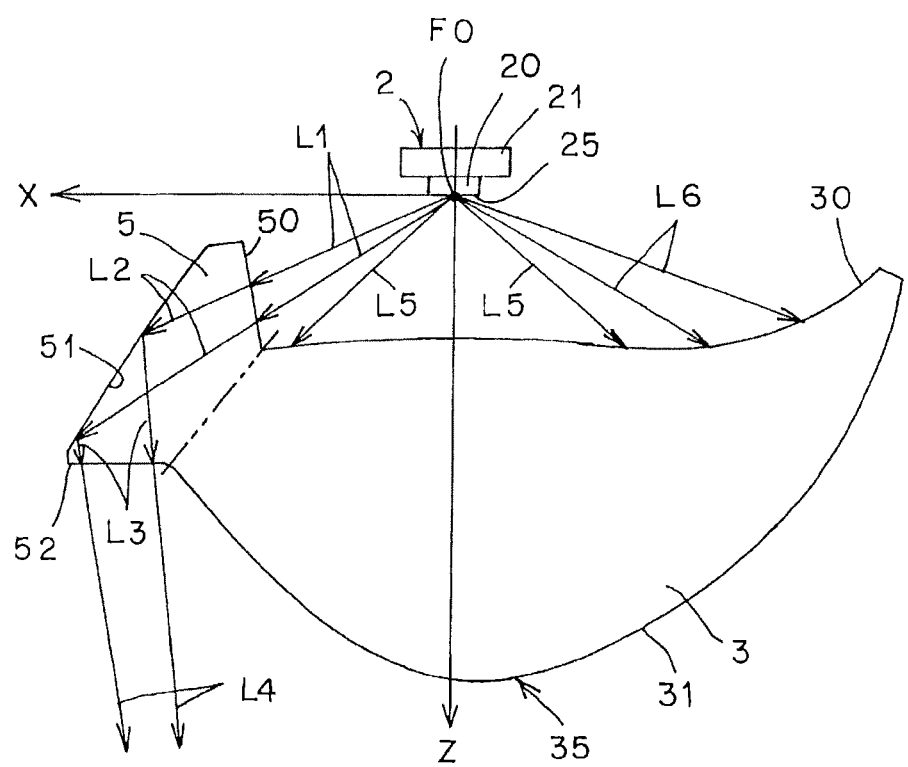
FIG. 11 is a sectional explanatory view showing the optical path of the auxiliary lens portion of the lens.

The main lens portion 3 has the reference optical axis Z and the reference focal point F, as shown in FIG. 11. The main lens portion 3 utilizes center light L5 and a part L6 of peripheral light of the light beams that are radiated from the semiconductor-type light source 2. The center light L5 is a light beam with a predetermined angle (about 40 degrees in this example) from the X axis or Y axis in a hemispheric radiation range of the semiconductor-type light source 2, and is a light beam that is caused to be incident to a center part of the main lens portion 3. In addition, the peripheral light is a light beam with its predetermined angle or less (about 40 degrees in this example) from the X axis or Y axis in the hemispheric radiation range of the semiconductor-type light source 2. A part L6 of the peripheral light is a light beam that is caused to be incident to a peripheral part of the main portion lens 3. The main lens portion 3 is a lens portion of a transmission type of transmitting light from the semiconductor-type light source 2, in this example.

The main lens portion 3 illuminates the light beams from the semiconductor-type light source 2 (the center light L5 and a part L6 of the peripheral light) forward of the vehicle C as a main light distribution pattern, i.e., a light distribution pattern for low beam (a light distribution pattern for passing) LP shown in FIG. 21(A) and FIG. 22(A); and a light distribution pattern for high beam (a light distribution pattern for cruising) HP shown in FIG. 21(B) and FIG. 22(B). In other words, the main lens portion 3 is configured to emit the light beams that are caused to be directly incident from the semiconductor-type light source 2 (the center light L5 and a part L6 of the peripheral light) forward of the vehicle C, as the light distribution pattern for low beam LP. This main lens portion 3 is also configured to emit the light from the semiconductor-type light source 2, the light being transmitted through the light control member 6 (the center light L5), and the light that is caused to be directly incident from the semiconductor-type light source 2 (a part L6 of the peripheral light) forward of the vehicle C, as the light distribution pattern for high beam HP.

The main lens portion 3 is made of: an incidence surface 30 on which the light from the semiconductor-type light source 2 is caused to be incident into the main lens portion 3; and an emission surface 31 from which the light incident into the main lens portion 3 is emitted. The incidence surface 30 of the main lens portion 3 is made of a free curved surface or a composite quadrature curved surface. The emission surface 31 of the main lens portion 3 is formed in a convex shape that gently protrudes in such a manner as to be opposed to the semiconductor-type light source 2, and this emission surface is made of a free curved surface or a composite quadrature curved surface.

(Description of Auxiliary Lens Portion 5)

Figure 10:
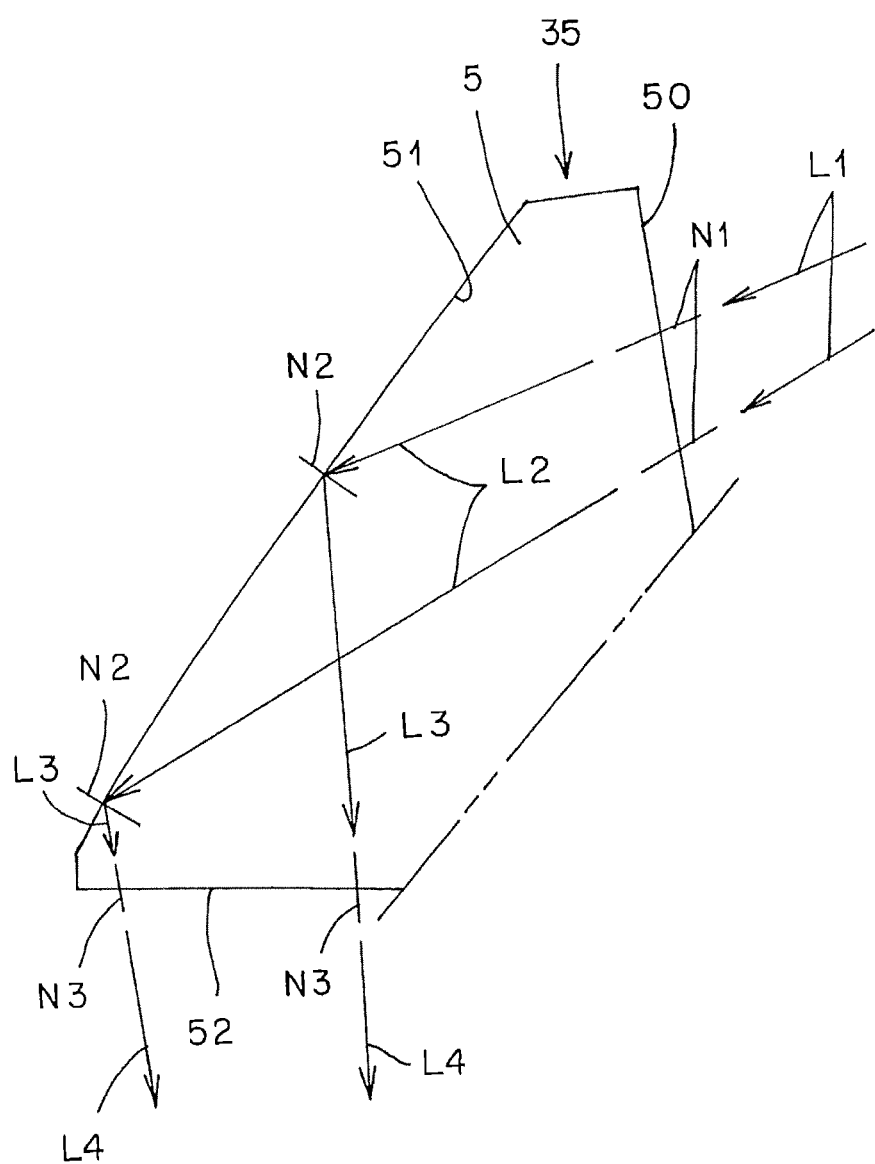
FIG. 10 is an enlarged sectional explanatory view showing an optical path of an auxiliary lens portion of a lens.

The auxiliary lens portion 5, as shown in FIG. 10 to FIG. 12, is provided on a peripheral edge of the main lens portion 3, in the first embodiment on an inside edge of the vehicle C, in other words, on a right edge. The auxiliary lens portion 5 efficiently utilizes another part L1 of the peripheral light of the light that is radiated from the semiconductor-type light source 2. Another part L1 of the peripheral light is a light beam that is caused to be incident to the auxiliary lens portion 5 of the peripheral light. The auxiliary lens portion 5, in this example, is a lens portion of a full reflection type, and is configured to fully reflect the light from the semiconductor-type light source 2 (another part L1 of the peripheral light). The auxiliary lens portion 5 is integrated with the main lens portion 3.

The auxiliary lens portion 5 is configured to illuminate the light L1 from the semiconductor-type light source 2 forward of the vehicle C and to a substantial center part of the light distribution pattern for high beam HP that is emitted from the main lens portion 3, as an auxiliary light distribution pattern, in the first embodiment, as a light distribution pattern for spot SP shown in FIG. 21(B) and FIG. 22(B).

The auxiliary lens portion 5 is made of: an incidence surface 50 on which light L1 is caused to be incident from the semiconductor-type light source 2 into the auxiliary lens portion 5; a reflection surface 51 on which light L2 that is caused to be incident from the incidence surface 50 into the auxiliary lens portion 5 is reflected; and an emission surface 52 on which reflected light L3 that is reflected on the reflection surface 51 is emitted from the inside of the auxiliary lens portion 5 to the outside.

The incidence surface 50 of the auxiliary lens portion 5 is made of a free curved surface on which a normal vector is determined in such a manner that light L1 from the semiconductor-type light source 2 is caused to be incident into the auxiliary lens portion 5 without being refracted anywhere. In other words, the incidence surface 50 of the auxiliary lens portion 5 is made of a free curved surface on which a radiation direction of light L1 from the semiconductor-type light source 2 and a direction of a normal line N1 of the incidence surface 50 of the auxiliary lens portion 5 are coincident with each other.

The reflection surface 51 of the auxiliary lens portion 5 is made of a free curved surface on which a normal vector is determined in such a manner that light L2 that is caused to be incident from the incidence surface 50 into the auxiliary lens portion 5 is fully reflected in a target angle direction on the screen of FIG. 21(B) and FIG. 22(B). In other words, the reflection surface 51 of the auxiliary lens portion 5 is made of a free curved surface on which a normal line N2 is determined in such a manner that light L2 that is caused to be incident from the incident surface 50 into the auxiliary lens portion 5 is fully reflected in a target angle direction on the screen of FIG. 21(B) and FIG. 22(B). In other words, an angle that is formed by the incident light L2 with respect to the normal line N2 of the reflection surface 51 and an angle that is formed by reflection light L3 with respect to the normal line N2 of the reflection surface 51 are equal to each other.

The emission surface 52 of the auxiliary lens portion 5 is made of a free curved surface on which a normal vector is determined in such a manner that the reflected light L3 that is fully reflected on the reflection surface 51 is emitted from the inside of the auxiliary lens portion 5 without being refracted to the outside. In other words, the emission surface 52 of the auxiliary lens portion 5 is made of a free curved surface on which a radiation direction of reflected light L3 that is fully reflected on the reflection surface 51 and a direction of a normal line N3 of the emission surface 52 of the auxiliary lens portion 5 are coincident with each other.

(Description of Heat Sink Member 4)

The heat sink member 4 is configured to radiate a heat that is generated in the semiconductor-type light source 2 to the outside. The heat sink member 4 is made of an aluminum die cast or a resin member having its appropriate heat conductivity, for example. The heat sink member 4, as shown in FIG. 2 to FIG. 8, is made of: a vertical plate portion 40; and a plurality of vertical plate-shaped fin portions 43 that are integrally provided on one surface of the vertical plate portion 40 (on a rear side surface or a rear face).

A reversely recessed housing groove portion is provided on a fixing surface that is another surface (a front side face or front face) of the vertical plate portion 40 of the heat sink member 4. In the housing groove portion, an upper horizontal housing groove portion configures a first housing groove portion 41 that serves as a first housing portion. In addition, in the housing groove portion, a lower part of a right side vertical groove portion configures a second housing groove portion 42 that serves as a second housing portion. A housing recessed portion may be employed in place of the housing groove portion. In other words, a first housing recessed portion and a second housing recessed portion may be employed in place of the first housing groove portion 41 and the second housing groove portion 42. The first housing groove portion 41 that serves as a first housing portion and the second housing groove portion 42 that serves as a second housing portion are provided in a perspective range of the lens 35 (a projection range of the lens 35 or a range of the lens 35) when the lens 35 is seen from a front face of the vehicle C.

On another surface of the vertical plate portion 40, inside of the housing groove portion, the semiconductor-type light source 2 is fixed by means of the screw 24. A part of the cover member 8 that is fixed to the semiconductor-type light source 2 and the shaft 82 are housed in vertical housing groove portions on both of the left and right sides of the housing groove portion. In addition, in another surface of the vertical plate portion 40, outside of the housing groove portion, the lens 35 is fixed by means of the screw 37.

A housing recessed portion 44 is provided at a part of a plurality of the fin portions 43 of the heat sink member 4, in other words, at an intermediate portion on the right side of a plurality of the fin portions 43. A hole 45 is provided on a bottom of the housing recessed portion 44.

(Description of Light Control Member 6)

The light control member 6 is configured in such a manner as to be changeably movable between a first location and a second location by means of the driving member 7. The first location is a location in a state shown in FIG. 2, FIG. 5, FIG. 7, FIG. 9(A), FIG. 13, FIG. 17, and FIG. 19. The second location is a location in a state shown in FIG. 6, FIG. 8, FIG. 14, FIG. 16, FIG. 18, and FIG. 20.

The light control member 6 is made of a light shading portion 60, a light transmission portion 61, and a mount portion 62. The light shading portion 60 and the mount portion 62 each are made of a light impermeable member, and are structured in such a manner as to be integrated with each other. The light transmission portion 61 is made of a light transmission member, and is structured in such a manner as to be separated from the light shading portion 60 and the mount portion 62. It is to be noted that in a state in which the light shading portion 60, the light transmission portion 61, and the mount portion 62 are integrally configured with a light transmission member, a light impermeable member may be configured in such a manner as to apply a light impermeable coating to the light shading portion 60 and the mount portion 62. In addition, the light control member 6 may be provided in such a manner that a transparent resin member and an opaque member are configured to be integrated with each other. For example, a transparent resin member of the light transmission portion 61 and an opaque resin member of the light shading portion 60 and the mount portion 62 are molded in such a manner as to be integrated with each other, or alternatively, a transparent resin member of the light transmission portion 61 is outsert-molded for an opaque steel plate of the light shading portion 60 and the mount portion 62.

The light control member 6 is rotatably mounted to the cover member 8 via the mount portion 62 between the first location and the second location, around a center axis O1 (the axis that is parallel to or is substantially parallel to the X axis) of the shaft 82. It is preferable that a rotational angle between the first location and the second location be equal to or less than 90 degrees. In this example, the angle is set to about 80 degrees. When the light control member 6 is positioned in the first location, a major part of the light control member 6 is housed in the first housing groove portion 41, and is positioned at a rear side more than another surface (a fixing surface) of the vertical plate portion 40 of the heat sink member 4.

(Description of Mount Portion 62)

The mount portion 62 is formed in a frame shape that opens at its center part. In other words, the mount portion 62 is made of both end parts in the forward/backward (vertical) direction around a center opening and left and right side parts. At a respective one of the left and right side parts of the mount portion 62, a circular through hole 63 of the rotation mechanism is provided in correspondence with the shaft 82 of the cover member 8. At the left side part of the mount portion 62, an arc-shaped groove 64 is provided in correspondence with the pin 83 of the cover member 8, and are formed in an arc shape around a center of the through hole 63. At the left side part of the mount portion 62, an engagingly stop piece 65 having a small hole is integrally provided.

The shaft 82 of the cover member 8 is rotatably inserted into the through hole 63 of the mount portion 62. The pin 83 of the cover member 8 is inserted into the arc-shaped groove 64 of the mount portion 62. As a result, via the mount portion 62, the light control member 6 is rotatably mounted to the cover member 8. A part of the mount portion 62 is housed in a vertical housing groove portion on a respective one of the left and right sides of the housing groove portion of the heat sink member 4, together with a part of the cover member 8 and the shaft 82. A rotation center shaft of the rotation mechanism that is made of the shaft 82 of the cover member 8 and a peripheral edge part of the through hole 63 of the mount portion 62 of the light control member 6 (a center shaft O1 of a shaft 82) is positioned on an opposite side of the lens 35, in other words, on a rear side, with respect to another face (a fixing surface) of the vertical plate portion 40 of the heat sink member 4.

When the light control member 6 is positioned in the first location, the mount portion 62 is housed together with the light transmission portion 61 in a location other than between the semiconductor-type light source 2 and the main lens portion 3, in other words, in the first housing groove portion 41. When the light control member 6 is positioned in the second location, the mount portion 62 is positioned between the semiconductor-type light source 2 and the main lens portion 3, together with the light transmission portion 61. When the light control member 6 is positioned in the first location, a major part of the mount portion 62 is housed in the first housing groove portion 41, together with the light transmission portion 61, and is positioned at a rear side more than another surface (a fixing surface) of the vertical plate portion 40 of the heat sink member 4.

(Description of Light Shading Portion 60)

The light shading portion 60 is formed in the shape of a bar that is integrally provided in a vertical direction (in a forward/backward direction) at one end (at a front end or a lower end) of a right side part of the mount portion 62. The light shading portion 60 serves as a shade. When the light control member 6 is positioned in the first location, the light shading portion 60 is positioned between the semiconductor-type light source 2 and the auxiliary lens portion 5 as shown in FIG. 7, and is configured to shade light L1 that is caused to be incident from the semiconductor-type light source 2 to the incidence surface 50 of the auxiliary lens portion 5 (another part of the peripheral light).

Figure 5:
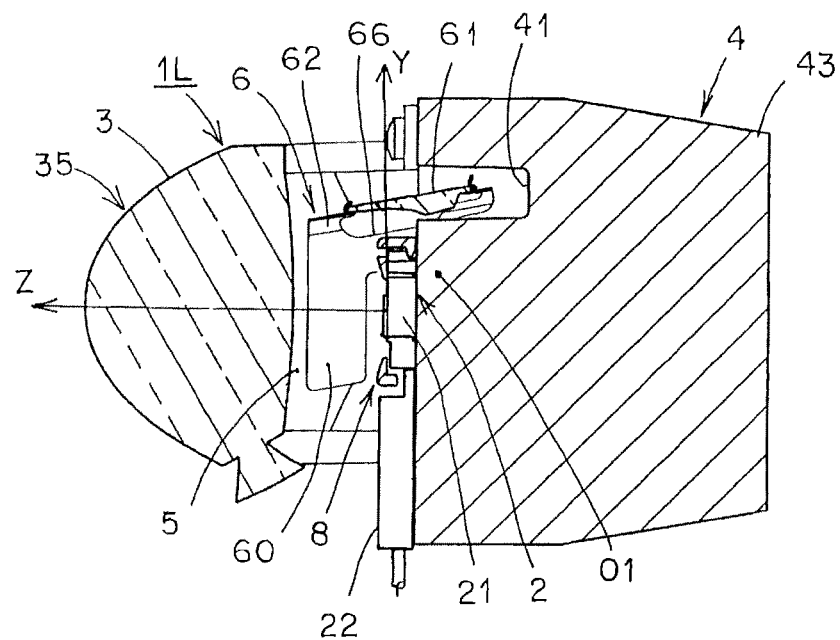
FIG. 5 is a sectional view taken along the line V-V in FIG. 3 when a light control member is positioned in a first location.
Figure 7:
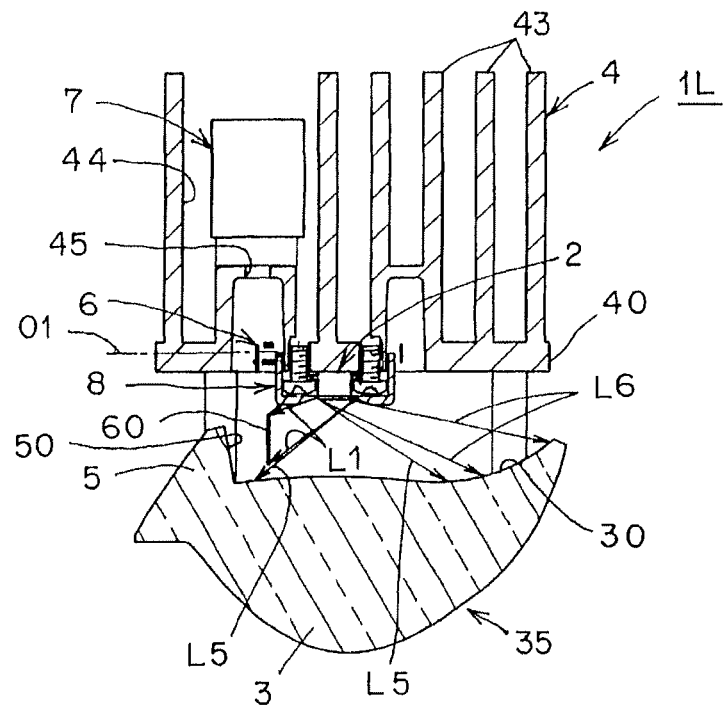
FIG. 7 is a sectional view taken along the line VII-VII in FIG. 3 when the light control member is positioned in the first location.

When the light control member 6 is positioned in the first location, the light shading portion 60 is positioned in a region (range) indicated below, as shown in FIG. 5, FIG. 7, and FIG. 9(A), and is established in a posture to be given below. In other words, the region is a region that is surrounded by: a line segment that connects a light shading start point 53 of the incidence surface 50 of the auxiliary lens portion 5 and a most distant point 26 of the light emission surface 25 of the semiconductor-type light source 2 to each other; a line segment that connects a light shading end point 54 of the incidence surface 50 of the auxiliary lens portion 5 and a most proximal point 27 of the light emission surface 25 of the semiconductor-type light source 2 to each other; a line segment 28 that is parallel to or is substantially parallel to the reference optical axis Z of the lens 35, the line segment passing through the most proximal point 27 of the light emission surface 25 of the semiconductor-type light source 2 (in other words, a line segment that is vertical or is substantially vertical to the light emission surface 25 of the semiconductor-type light source 2); and the incidence surface 50 of the auxiliary lens portion 5. The posture is vertical to or is substantially vertical to the light emission surface 25 of the semiconductor-type light source 2 (in other words, the posture is parallel to or is substantially parallel to the reference optical axis Z of the lens 35). The light shading portion 60 mentioned previously is positioned in the region (the range) mentioned previously, and is established in the posture mentioned previously, thereby making it possible to reduce an optical loss.

The optical loss mentioned previously, as shown in FIG. 9(A), can be expressed by an angle θ that is formed by: a line segment that connects a light shading start point 53 of an incidence surface 50 of an auxiliary lens portion 5 and a most distant point 26 of a light emission surface 25 of a semiconductor-type light source 2 to each other; and a line segment that comes into contact with the above line segment, and that connects an end (a front end) of a light shading portion 60 and a most proximal point 27 of the light emission surface 25 of the semiconductor-type light source 2 to each other. This angle θ (in other words, the optical loss) is reduced more remarkably in comparison with an angle θ1 of a light shading portion 601 shown in FIG. 9(B). The light shading portion 601 shown in FIG. 9(B) is positioned in a predetermined region in the same manner as that described previously, and is parallel to or is substantially parallel to the light emission surface 25 of the semiconductor-type light source 2 (in other words, this light shading portion is vertical to or is substantially vertical to a reference optical axis Z of a lens 35).

Figure 6:
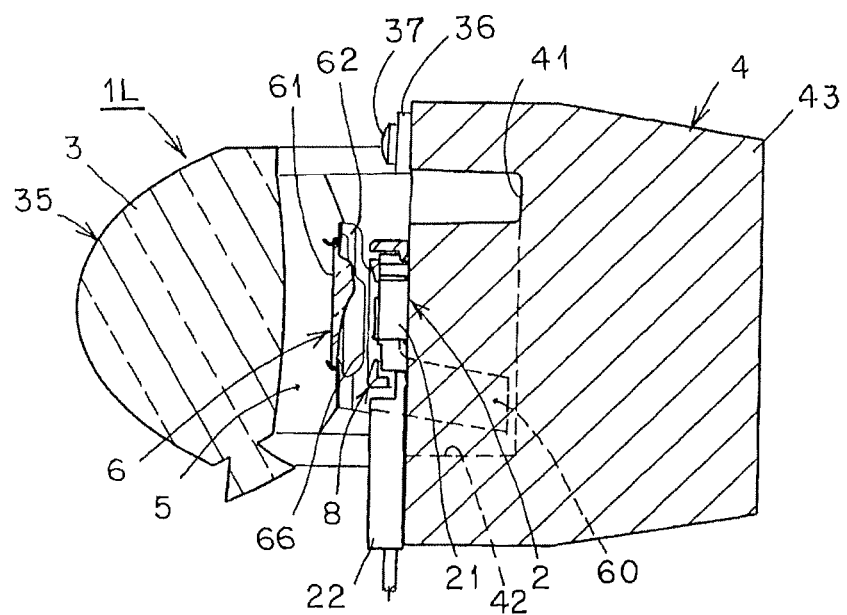
FIG. 6 is a sectional view taken along the line V-V in FIG. 3 when the light control member is positioned in a second location.
Figure 8:
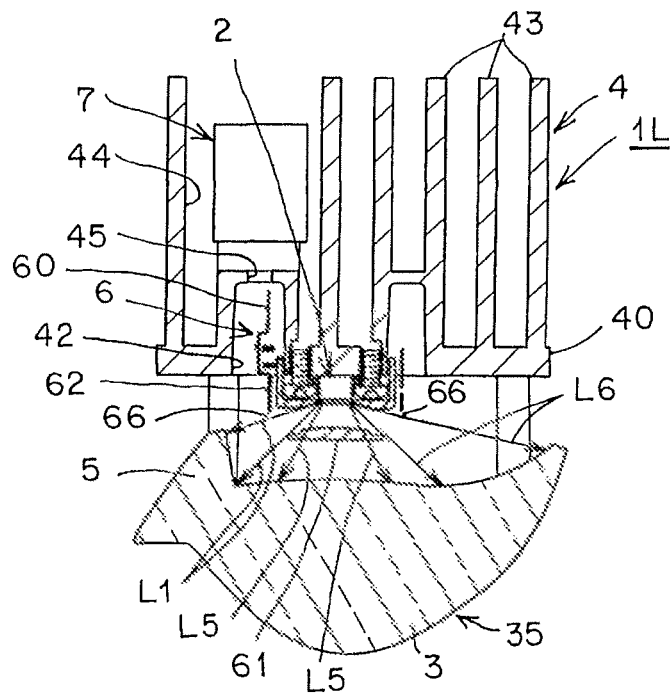
FIG. 8 is a sectional view taken along the line VII-VII in FIG. 3 when the light control member is positioned in the second location.
Figure 9:
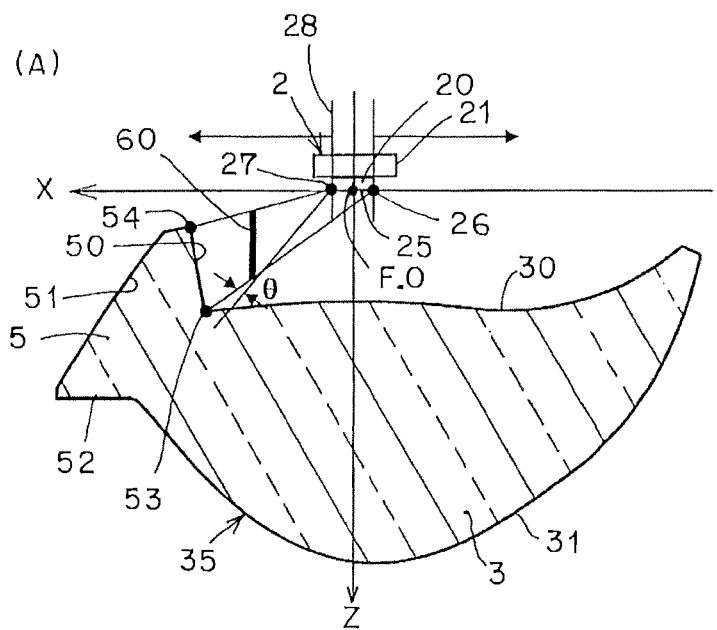
FIG. 9 is a horizontal sectional explanatory view showing a function of a light shading portion when the light control member is positioned in the first location.
Figure 9:
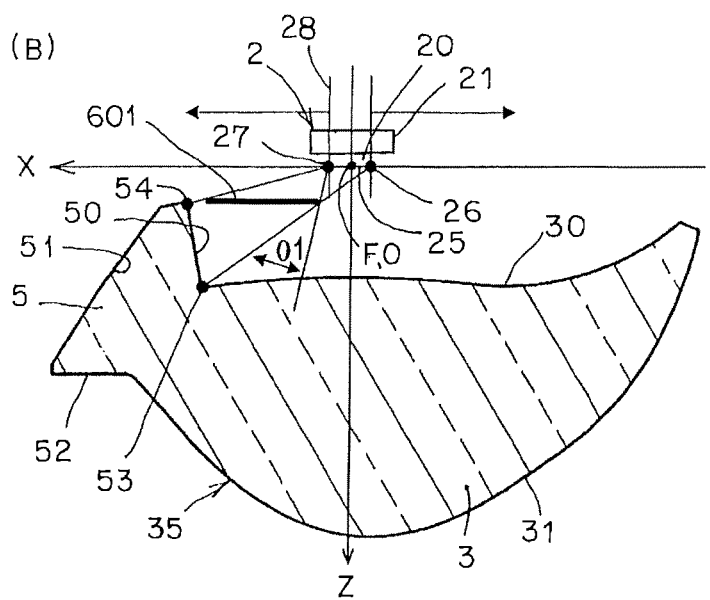

When the light control member 6 is positioned in the second location, the light shading portion 60, as shown in FIG. 6 and FIG. 8, is housed in a location other than between the semiconductor-type light source 2 and the auxiliary lens portion 5, in other words, in the second housing groove portion 42, and light L1 from the semiconductor-type light source 2 (a part of the peripheral light) is caused to be incident to the auxiliary lens portion 5. As a result, as shown in FIG. 21(B) and FIG. 22(B), the light distribution pattern for spot SP is illuminated forward of the vehicle C and to a substantial center part of the light distribution pattern for high beam HP that is emitted from the main lens portion 3. When the light control member 6 is positioned in the second location, a major part of the light shading portion 60 is housed in the second housing groove portion 42, and is positioned at a rear side more than another surface (a fixing surface) of the vertical plate portion 40 of the heat sink member 4.

(Description of Light Transmission Portion 61)

The light transmission portion 61 is formed in the shape of a plate in such a manner as to be fixed to both of forward and backward center parts of the mount portion 62. When the light control member is positioned in the first location, the light transmission portion 61, as shown in FIG. 5 and FIG. 7, is housed in a location other than between the semiconductor-type light source 2 and the main lens portion 3, in other words, in the first housing groove portion 41; and the light beams from the semiconductor-type light source 2 (the center light L5 and a part L6 of the peripheral light) are caused to be directly incident to a center part of the main lens portion 3. As a result, as shown in FIG. 21(A) and FIG. 22(A), a center portion LPC of the light distribution pattern for low beam LP is illuminated forward of the vehicle C. When the light control member 6 is positioned in the first location, a major part of the light transmission portion 61 is housed in the first housing groove portion 41, and is positioned at a rear side more than another surface (a fixing surface) of the vertical plate portion 40 of the heat sink portion 4.

When the light control member 6 is positioned in the second location, the light transmission portion 61, as shown in FIG. 6 and FIG. 8, is positioned between the semiconductor-type light source 2 and the main lens portion 3; and the light from the semiconductor-type light source 2 (the center light L5) is transmitted and then the thus transmitted light is caused to be incident to a center part of the main lens portion 3. As a result, as shown in FIG. 21(B) and FIG. 22(B), a center portion HPC of the light distribution pattern for high beam HP is illuminated forward of the vehicle C.

The light transmission portion 61, in this example, is made of a prism (refer to a prism member described in Japanese Unexamined Patent Application Publication No. 2010-153181). The light transmission portion 61, as shown in FIG. 21(A), FIG. 21(B), FIG. 22(A), and FIG. 22(B), is configured to change an optical path of the center light L5 that is caused to be incident to a center part of the main lens portion 3 among the light beams that are radiated from the semiconductor-type light source 2 and then deform a center portion LPC of the light distribution pattern for low beam LP and a center portion HPC of the light distribution pattern for high beam HP. In other words, the light transmission portion 61 is configured to form a part of the light of the center portion LPC of the light distribution pattern for low beam LP in a reverse V shape upward from a cutoff line CL of the center portion LPS of the light distribution pattern for low beam LP and then deform the center portion LPC of the light distribution pattern for low beam LP to the center portion HPC of the light distribution pattern for high beam HP. The center portion LPC of the light distribution pattern for low beam LP and the center portion HPC of the light distribution pattern for high beam HP are formed of light that is concentrated to a center.

(Description of Opening Portions 66)

Opening portions 66 are formed between both of the left and right sides of the light transmission portion 61 and both of the right and left side parts of the mount portion 62, respectively. When the light control member 6 is positioned in the first location, the opening portions 66 on both of the left and right sides are housed in a location other than between the semiconductor-type light source 2 and the main lens portion 3, in other words, in the first housing groove portion 41, together with a major part of the light transmission portion 61 and a major part of the mount portion 62.

When the light control member 6 is positioned in the second location, the opening portions 66 on both of the left and right sides, as shown in FIG. 8, are positioned between the semiconductor-type light source 2 and the main lens portion 3, together with the light transmission portion 61 and the mount portion 62, causes the light beams from the semiconductor-type light source 2 (a part L6 of the peripheral light and another part L1 of the peripheral light beam) to be transmitted as they are, and causes the thus transmitted light beams to be incident to a peripheral part of the main lens portion 3 and the auxiliary lens portion 5. As a result, as shown in FIG. 21(B) and FIG. 22(B), the light beams that are emitted from the peripheral part of the main lens portion 3 and the auxiliary lens portion 5 are illuminated forward of the vehicle C as left and light end portions HPL and HPR of the light distribution pattern for high beam HP and as the light distribution pattern for spot SP.

The opening portion 66 on the left side, as shown in FIG. 8, FIG. 21(B), and FIG. 22(B), is configured to cause a part L6 of the peripheral light from the semiconductor-type light source 2 to be transmitted as it is and then cause the thus transmitted part of the peripheral light to be incident to a peripheral part of the main lens portion 3. Therefore, the left and right end portions HPL and HPR of the light distribution pattern HP for high beam are substantially identical to the left and right end portions LPL and LPR of the light distribution pattern for low beam LP without being deformed. As a result, by means of the opening portion 66 on the left side, the left and right end portions HPL and HPR of the light distribution pattern for high beam HP can be maintained in such a manner as to be substantially identical to the left and right end portions LPL and LPR of the light distribution pattern for low beam LP. In other words, as shown in FIG. 22(C), as is the case in which all of the light beams from the semiconductor-type light source have been switched from a light distribution pattern for low beam to a light distribution pattern for high beam HP1, there can hardly occur a case in which a portion P2 at which the amount of light is insufficient at each of the left and right end portions HPL and HPR of the light distribution pattern for high beam HP1.

The left and right end portions LPL and LPR of the light distribution pattern for low beam LP and the left and right end portions HPL and HPR of the light distribution pattern for high beam HP are formed of light beams (the light beams of lateral scattering light distribution patterns) that are scattered to the leftward and rightward sides (shoulder edge sides on a road surface). Here, a boundary between a respective one of the center portion LPC of the light distribution pattern for low beam LP and the center portion HPC of the light distribution pattern for high beam HP and a respective one of the left and right end portions LPL and LPR of the light distribution pattern for low beam LP and the left and right end portions HPL and HPR of the light distribution pattern for high beam HP is on the order of about 20 degrees (about 16 degrees to about 24 degrees) in the transverse and horizontal directions, as shown in FIG. 21.

(Description of Driving Member 7)

The driving member 7 is configured to cause the light control member 6 to be changeably (rotatably or turnably) positioned in the first location or the second location, as shown in FIG. 2, FIG. 7, FIG. 8, and FIG. 15 to FIG. 20. The driving member 7 is made of a solenoid 70, a connecting pin 71, and a spring 72.

The solenoid 70 is provided with a forward/backward rod 73 having a small hole. A fixing piece 74 is provided in such a manner as to be integrated with the solenoid 70. The solenoid 70 is housed in the housing recessed portion 44 of the heat sink portion 4. The forward/backward rod 73 is inserted into the hole 45 of the heat sink member 4. The fixing piece 74 is fixed to the heat sink member 4 by means of a screw 75. As a result, the driving member 7 is fixed to the heat sink member 4.

Figure 15:
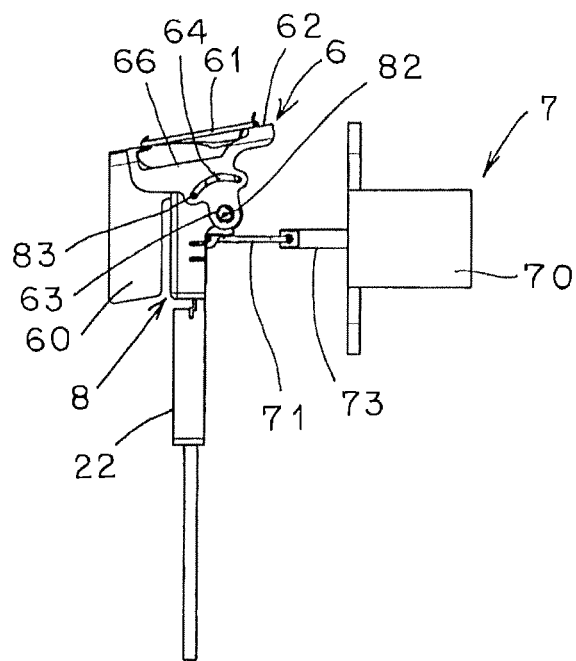
FIG. 15 is a side view showing the semiconductor-type light source, the light control member, the driving member, and the cover member when the light control member is positioned in the first location.
Figure 16:
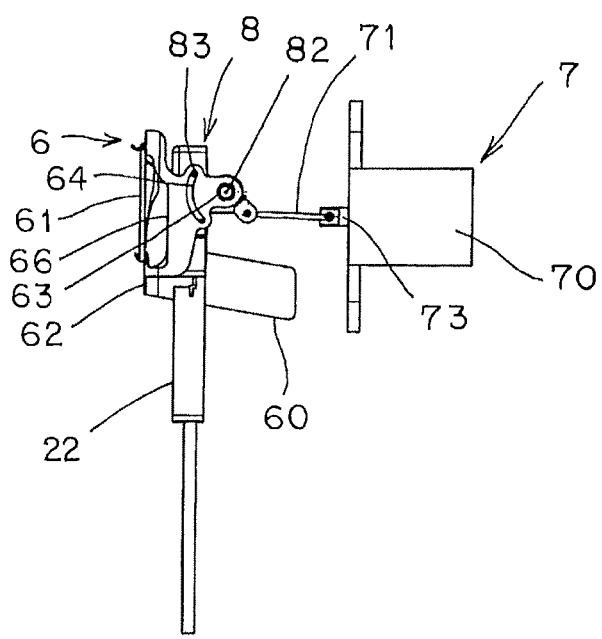
FIG. 16 is a side view showing the semiconductor-type light source, the light control member, the driving member, and the cover member when the light control member is positioned in the second location.
Figure 17:
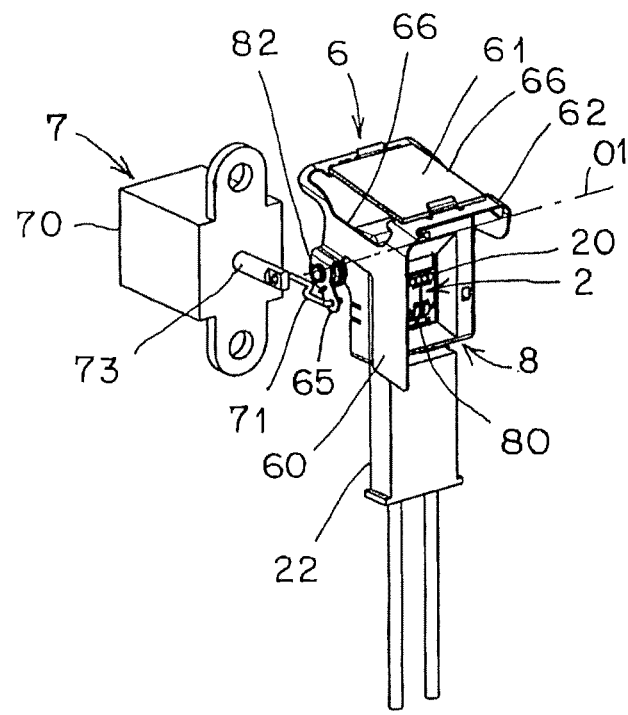
FIG. 17 is a perspective view showing the semiconductor-type light source, the light control member, the driving member, and the cover member when the light control member is positioned in the first location.
Figure 18:
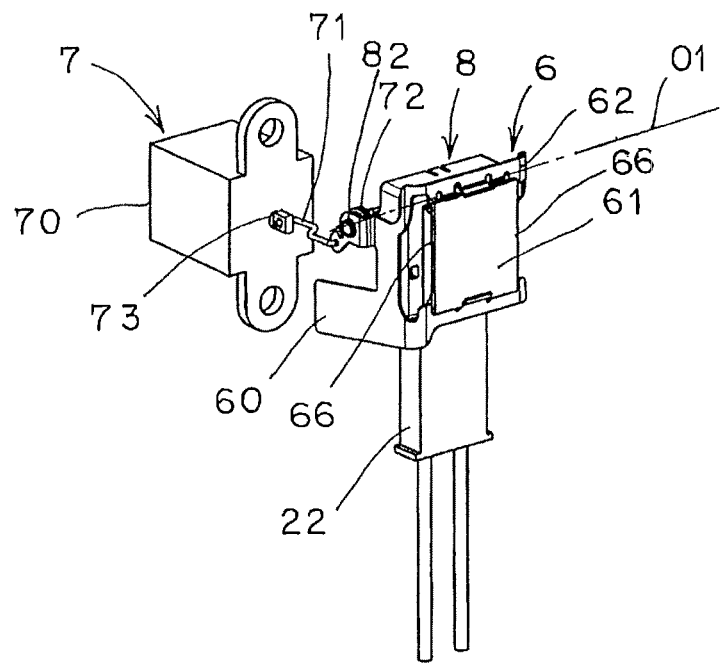
FIG. 18 is a perspective view showing the semiconductor-type light source, the light control member, the driving member, and the cover member when the light control member is positioned in the second location.
Figure 19:
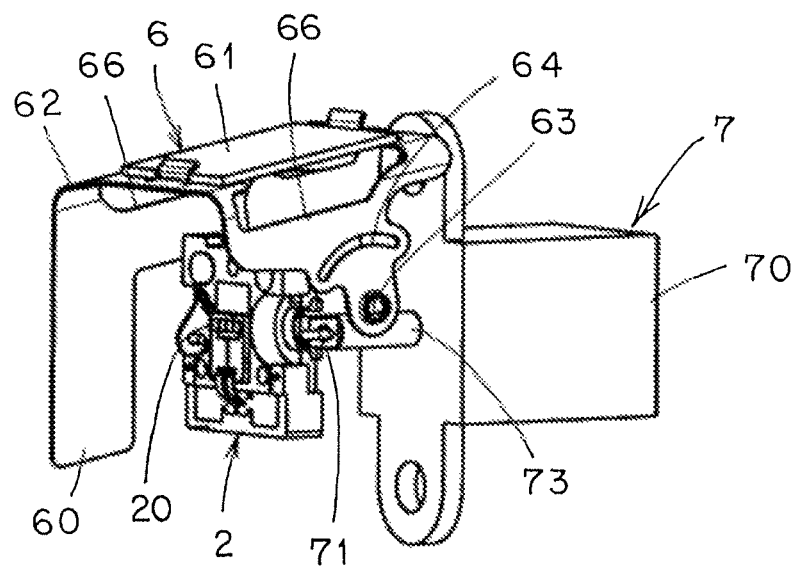
FIG. 19 is a perspective view showing the semiconductor-type light source, the light control member, the driving member, and the cover member when the light control member is positioned in the first location.
Figure 20:
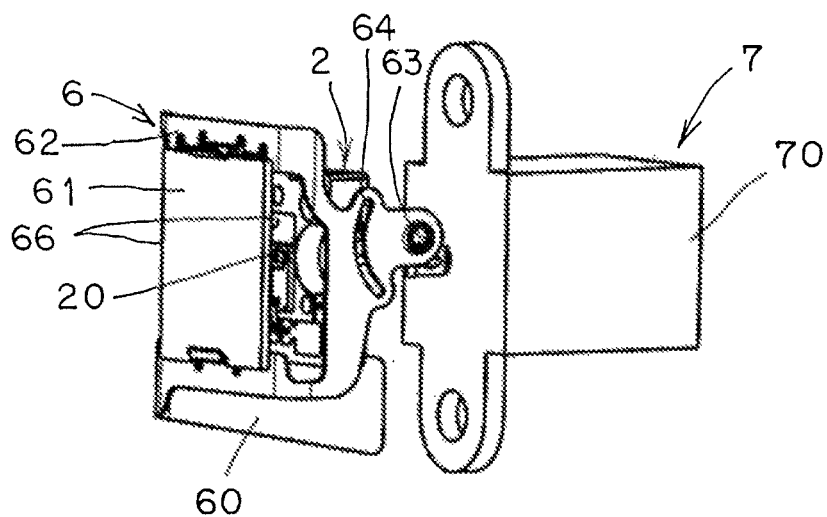
FIG. 20 is a perspective view showing the semiconductor-type light source, the light control member, and the driving member when the light control member is positioned in the second location.

Both ends of the connecting pin 71 are respectively mounted to the engagingly stop piece 65 of the light control member 6 and the forward/backward rod 73. Both ends of the spring 72 are respectively mounted to the light control member 6 as a rotating side (a movable side) and the cover member 8 as a stationary side. As a result, when no power is supplied to the solenoid 70, as shown in FIG. 15, FIG. 17, and FIG. 19, by means of a spring force of the spring 72, the forward/backward rod 73 is positioned in a forward position, and the light control member 6 is positioned in the first location. When power is supplied to the solenoid 70, as shown in FIG. 16, FIG. 18, and FIG. 20, the forward/backward rod 73 moves back against the spring force of the spring 72 and then is positioned in a backward location, and the light control member 6 is positioned in the second location.

(Description of Function in the First Embodiment)

The vehicle headlamps 1L and 1R according to the first embodiment are made of the constituent elements as described above, and hereinafter, its related functions will be described.

When no operation is made, in other words, when no power is supplied to the solenoid 70, the forward/backward rod 73 is positioned in the forward location, and the light control member 6 is positioned in the first location by means of the spring force of the spring 72. At this time, the light shading portion 60, as shown in FIG. 7, is positioned between the semiconductor-type light source 2 and the auxiliary lens portion 5. On the other hand, a major part of the light transmission portion 61 and a major part of the mount portion 62, as shown in FIG. 5, are housed in a location other than between the semiconductor-type light source 2 and the main lens portion 3, in other words, in the first housing groove portion 41.

When no operation is made, the light emitting chip 20 of the semiconductor-type light source 2 is lit. Then, among the light beams that are radiated from the light emission surface 25 of the light emitting chip 20, the center light L5 of the semiconductor-type light source 2 and a part L6 of the peripheral light, as shown in FIG. 7, are caused to be incident from the incidence surface 30 of the main lens portion 3 into the main lens portion 3. At this time, the incident light is optically distributed and controlled in the incidence surface 30. The incident light that is caused to be incident into the main lens portion 3 is emitted from the emission surface 31 of the main lens portion 3. At this time, the emitted light is optically distributed and controlled in the emission surface 31. The emitted light from the main lens portion 3, as shown in FIG. 21(A) and FIG. 22(A), is illuminated forward of the vehicle C as the light distribution pattern for low beam LP having the cutoff line CL.

The center light L5 of the semiconductor-type light source 2, which is caused to be incident to the center part of the main lens portion 3, is illuminated forward of the vehicle C as the left and right end portions LPL and LPR of the light distribution pattern for low beam LP. A part L6 of the peripheral light of the semiconductor-type light source 2, which is caused to be incident to the peripheral part of the main lens portion 3, is illuminated forward of the vehicle C as the center portion LPC of the light distribution pattern for low beam LP.

On the other hand, among the light beams that are radiated from the light emission surface 25 of the light emitting chip 20, the light (another part of the peripheral light) L1, which is the peripheral light L1 of the semiconductor-type light source 2, and which is to be incident to the incidence surface 50 of the auxiliary lens portion 5, as shown in FIG. 7, is shaded by means of the light shading portion 60 that is positioned between the semiconductor-type light source 2 and the incidence surface 50 of the auxiliary lens portion 5. As a result, when no operation is made, as shown in FIG. 21(A) and FIG. 22(A), the light distribution pattern for low beam LP having the cutoff line CL is illuminated forward of the vehicle C.

When the light control member 6 is positioned in the first location, the light shading portion 60, as shown in FIG. 9(A), is positioned in a predetermined region, and is vertical to or is substantially vertical to the light emission surface 25 of the semiconductor-type light source 2 (the light shading portion is parallel to or is substantially parallel to the reference optical axis Z of the lens 35). The predetermined region, as described previously, is a region that is surrounded by: a line segment that connects the light shading start point 53 of the incidence surface 50 of the auxiliary lens portion 5 and the most distant point 26 of the light emission surface 25 of the semiconductor-type light source 2 to each other; a line segment that connects the light shading end point 54 of the incidence surface 50 of the auxiliary lens portion 5 and the most proximal point 27 of the light emission surface 25 of the semiconductor-type light source 2 to each other; and a line segment 28 that is parallel to or is substantially parallel to the reference optical axis Z of the lens 35, the line segment passing through the most proximal point 27 of the light emission surface 25 of the semiconductor-type light source 2; and the incidence surface 50 of the auxiliary lens portion 5. As a result, the light shading portion 60 is capable of reliably shading the light (a part of the peripheral light) L1 that is the peripheral light L1 of the semiconductor light source 2 and that is to be incident to the incidence surface 50 of the auxiliary lens portion 5 among the light beams that are radiated from the light emission surface 25 of the light emitting chip 20.

After that, power is supplied to the solenoid 70. Then the forward/backward rod 73 moves back against the spring force of the spring 72, and is positioned in the backward location, and the light control member 6 rotates from the first location to the second location and then is positioned in the second location. In other words, the light transmission portion 61 that has been housed in the first housing groove portion 41 up to now, as shown in FIG. 6 and FIG. 8, is positioned between the semiconductor-type light source 2 and the main lens portion 3. In addition, a major part of the light shading portion 60 that has been positioned between the semiconductor-type light source 2 and the auxiliary lens portion 5 up to now is housed in the second housing groove portion 42, as shown in FIG. 6.

Among the light beams that are radiated from the light emission surface 25 of the light emitting chip 20, the center light L5 of the semiconductor-type light source 2 is then transmitted through the light transmission portion 61 and then the thus transmitted light, as shown in FIG. 8, is caused to be incident from the center part of the incidence surface 30 of the main lens portion 3 into the main lens portion 3. At this time, the incident light is optically distributed and controlled in the incidence surface 30. The incident light that is caused to be incident into the main lens portion 3 is emitted from the emission surface 31 of the main lens portion 3. At this time, the emitted light is optically distributed and controlled in the emission surface 31. The emitted light from the main lens portion 3, as shown in FIG. 21(B) and FIG. 22(B), is illuminated forward of the vehicle C as the center portion HPC of the light distribution pattern for high beam HP.

The light transmission portion 61 is configured to form a part of the light of the center portion LPC of the light distribution pattern for low beam LP in a reverse V shape upward from the cutoff line CL of the center portion LPC of the light distribution pattern for low beam LP and then deform from the center portion LPC of the light distribution pattern for low beam LP to the center portion HPC of the light distribution pattern for high beam HP. As a result, the center portion LPC of the light distribution pattern for low beam LP shown in FIG. 21(A) and FIG. 22(A) is deformed by means of the light transmission portion 61, and the deformed center portion is illuminated forward of the vehicle C as the center portion HPC of the light distribution pattern for high beam HP shown in FIG. 21(B) and FIG. 21(B).

Thus, the center portion LPC of the light distribution pattern for low beam LP shown in FIG. 21(A) and FIG. 22(A) fails to include a location P1 at an upper end of a guardrail on a left side shoulder edge of a road that is about 5 m forward from the vehicle C. On the other hand, the center portion HPC of the light distribution pattern for high beam HP shown in FIG. 21(B) and FIG. 22(B) includes the location P1 at the upper end of the guardrail of the left side shoulder edge that is 5 m forward from the vehicle C. As a result, it becomes possible to obtain a sense of moderation in switching between the light distribution pattern for low beam LP shown in FIG. 21(A) and FIG. 22(A) and the light distribution pattern for high beam HP shown in FIG. 21 (B) and FIG. 22(B).

On the other hand, among the light beams that are radiated from the light emission surface 25 of the light emitting chip 20, a part L6 of the peripheral light of the semiconductor-type light source 2, as shown in FIG. 8, passes through the left side opening portion 66 of the mount portion 62 and then is caused to be incident from the peripheral part of the incidence surface 30 of the main lens portion 3 into the main lens portion 3. At this time, the incident light is optically distributed and controlled in the incidence surface 30. The incident light that is caused to be incident into the main lens portion 3 is emitted from the emission surface 31 of the main lens portion 3. At this time, the emitted light is optically distributed and controlled in the emission surface 31. The emitted light from the main lens portion 3, as shown in FIG. 21(B) and FIG. 22(B), is illuminated forward of the vehicle C as the left and right end portions HPL and HPR of the light distribution pattern for high beam HP.

A part L6 of the peripheral light from the semiconductor-type light source 2 passes through the left side opening portion 66 as it is, and then, is caused to be incident to the peripheral part of the main lens portion 3. Thus, the left and right end portions HPL and HPR of the light distribution pattern for high beam HP are substantially identical to the left and right end portions LPL and LPR of the light distribution pattern for low beam LP that is formed by a part L6 of the peripheral light from the semiconductor-type light source 2 that is caused to be incident to the peripheral part of the main lens portion 3 without being deformed by anything. As a result, by means of the left side opening portion 66, the left and right end portions HPL and HPR of the light distribution pattern for high beam HP can be maintained in such a manner as to be substantially identical to the left and right end portions LPL and LPR of the light distribution pattern for low beam LP. In other words, as shown in FIG. 22(C), as is the case in which all of the light beams from the semiconductor-type light source 2 have been switched from a light distribution pattern for low beam LP to a light distribution pattern for high beam HP1, there can hardly occurs a case in which a portion P2 at which the amount of light is insufficient occurs at both of the left and right end portions HPL and HPR of the light distribution pattern for high beam HP1.

In addition, among the light beams that are radiated from the light emission surface 25 of the light emitting chip 20, as shown in FIG. 8, another part L1 of the peripheral light of the semiconductor-type light source 2, which has been shaded by the light shading portion 60 up to now, passes through the right side opening portion 66 of the mount portion 62 and then are caused to be incident from the incidence surface 50 of the auxiliary lens portion 5 into the auxiliary lens portion 5. At this time, the incident light L2 is optically distributed and controlled in the incidence surface 50. The incident light L2 that is caused to be incident into the auxiliary lens portion 5 is fully reflected on the reflection surface 51 of the auxiliary lens portion 5. At this time, reflected light L3 is optically distributed and controlled in the reflection surface 51. The reflected light L3 after fully reflected is emitted from the emission surface 52. At this time, emitted light L4 is optically distributed and controlled in the emission surface 52. The emitted light L4 from the auxiliary lens portion 5 fails to include a spectroscopic color, and as shown in FIG. 21(B) and FIG. 22(B), the emitted light is illuminated as the light distribution pattern for spot SP of the light distribution pattern for high beam HP, forward of the vehicle C and to a substantial center part of the light distribution pattern for high beam HP that is illuminated from the main lens portion 3.

After that, power supply to the solenoid 70 is shut down. Then, the forward/backward rod 73 moves forward by means of the spring force of the spring 72 and then is positioned in the forward location, and the light control member 6 rotates from the second location to the first location and then is positioned in the first location. In other words, the light transmission portion 61 that has been positioned between the semiconductor-type light source 2 and the main lens portion 3 up to now is housed in the first housing groove portion 41. In addition, the light shading portion 60 that has been housed in the second housing groove portion 42 up to now is positioned between the semiconductor-type light source 2 and the auxiliary lens portion 5.

The light distribution pattern for low beam LP shown in FIG. 21(A) and the light distribution pattern for high beam HP shown in FIG. 21(B) respectively indicate light distribution patterns that are obtained by means of the left side vehicle headlamp 1L. A light distribution pattern for low beam (not shown) and a light distribution pattern for high beam (not shown), a respective one of which is obtained by means of the right side vehicle headlamp 1R, are substantially transversely symmetrical to the light distribution pattern for low beam LP shown in FIG. 21(A) and the light distribution pattern for high beam HP shown in FIG. 21(B), a respective one of which is obtained by means of the left side vehicle headlamp 1L. In other words, the outside spreads of light distribution patterns from the vehicle C are transversely symmetrical to each other, there will be no change in cutoff line, and a spot portion moves in parallel in a horizontal direction. The light distribution pattern for low beam LP shown in FIG. 22 (A) and the light distribution pattern for high beam shown in FIG. 22 are then formed by weighting (combining) the light distribution pattern for low beam LP shown in FIG. 21 (A) and the light distribution pattern for high beam HP shown in FIG. 21(B) with each other, a respective one of which is obtained by means of the left side vehicle headlamp 1L, and the light distribution pattern for low beam and the light distribution pattern for high beam, a respective one of which is obtained by means of the right side vehicle headlamp 1R.

(Description of Advantageous Effects in the First Embodiment)

The vehicle headlamps 1L and 1R according to the first embodiment are made of the constituent elements and functions as described above, and hereinafter, its related advantageous effects will be described.

The vehicle headlamps 1L and 1R according to the first embodiment each are provided in such a manner that the cover member 8 is fixed to another face (the fixing surface) of the vertical plate portion 40 of the heat sink member 4 so as to be integrated with the semiconductor-type light source 2, and to the cover member 8, the light control member 6 is mounted so as to be changeably rotatable and movable between the first location and the second location. As a result, dispersion in relative position between the semiconductor-type light source 2 and the light control member 6 can be reduced. In this manner, dispersion between a light distribution pattern for low beam LP and a light distribution pattern for high beam HP can be reduced, making it possible to contribute to safe driving. In addition, a dimensional tolerance between the semiconductor-type light source 2 and the light control member 6 can be mitigated, its related manufacturing efficiency is improved, and its related manufacturing costs can be reduced accordingly.

The vehicle headlamps 1L and 1R according to the first embodiment each are provided in such a manner that as shown in FIG. 5 and FIG. 7, the rotation center shaft of the rotation mechanism that is made of the shaft 82 of the cover member 8 and a peripheral edge part of the through hole 63 of the mount portion 62 of the light control member 6 (the center shaft O1 of a shaft 82) is positioned at an opposite side of the lens 35, in other words, on a rear side, with respect to another face (a fixing surface) of the vertical plate portion 40 of the heat sink member 4. As a result, the light control member 6 can be switched in such a manner as to be rotated and moved between the first location with a narrow gap and the second location with a narrow gap. In this manner, it becomes possible to reduce dimensions in vertical direction and dimensions in forward/backward direction of the lamp unit that is made of the constituent elements that are designated by reference numerals 2, 35, 4, 6, 7, and 8, and it also becomes possible to reduce the lamp unit that is made of the constituent elements that are designated by reference numerals 2, 35, 4, 6, 7, and 8 in size accordingly. In particular, the light transmission portion 61 and the mount portion 62 of the light control member 6 that is disposed in parallel to or substantially in parallel to the rotation center shaft of the rotation mechanism (the center shaft O1 of the shaft 82) can be rotated and positioned in the first housing groove portion 41 with a narrow gap and between the semiconductor-type light source 2 and the lens 35 with a narrow gap. In this manner, it becomes possible to reduce dimensions in vertical direction and dimensions in forward/backward direction of the lamp unit that is made of the constituent elements that are designated by reference numerals 2, 35, 4, 6, 7, and 8, and it also becomes possible to reduce the lamp unit that is made of the constituent elements that are designated by reference numerals 2, 35, 4, 6, 7, and 8 in size accordingly.

(Description of Second Embodiment)

Figure 24:
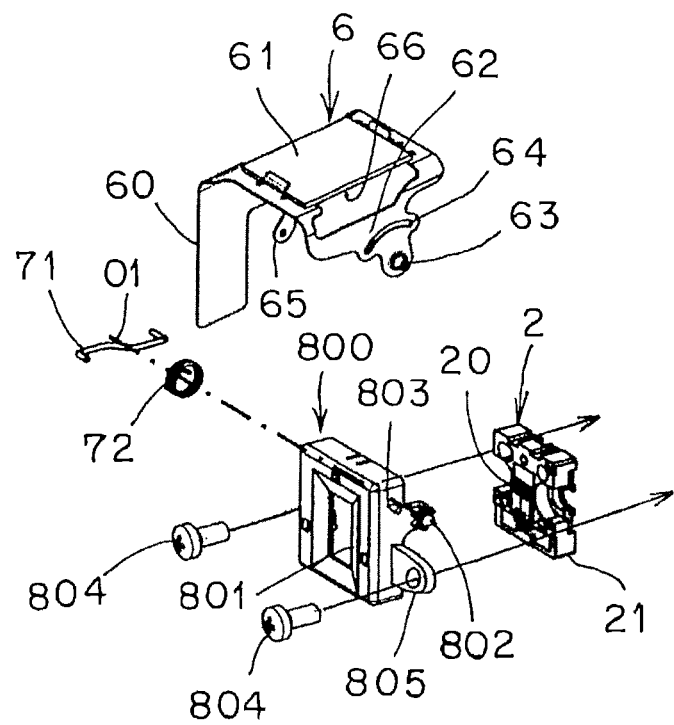
FIG. 24 shows a second embodiment of a vehicle headlamp according to the present invention, and is an exploded perspective view of the semiconductor-type light source, the cover member, and a light control member.

FIG. 24 shows a second embodiment of a vehicle headlamp according to the present invention. Hereinafter, the vehicle headlamp according to the second embodiment will be described. In the figure, like constituent elements shown in FIG. 1 to FIG. 23 are designated by like reference numerals.

A cover member 800 of the vehicle headlamp according to the second embodiment, as is the case with the cover member 8 of the vehicle headlamp according to the first embodiment described previously, has a window portion 801, a shaft 802, and a pin 803, and a mount piece 805 having a small circular through hole is integrally provided on each of the left and right sides.

The vehicle headlamp according to the second embodiment is provided in such a manner that in a state in which a semiconductor-type light source 2 is sandwiched between the cover member 800 and a heat sink member 4, the mount piece 805 of the cover member 800 is fixed to the heat sink member 4 by means of a screw 804. In this manner, the cover member 800 is fixed to the heat sink member 4 by means of the screw 804, and the semiconductor-type light source 2 is fixed in a state in which the semiconductor-type light source is sandwiched between the cover member 800 and the heat sink member 4. In other words, the cover member 800 is fixed to the heat sink member 4 in such a manner as to be integrated with the semiconductor-type light source 2. In addition, a light control member 6 is mounted to the cover member 800 in such a manner as to be changeably rotatable and movable between a first location and a second location.

(Description of Third Embodiment)

Figure 25:
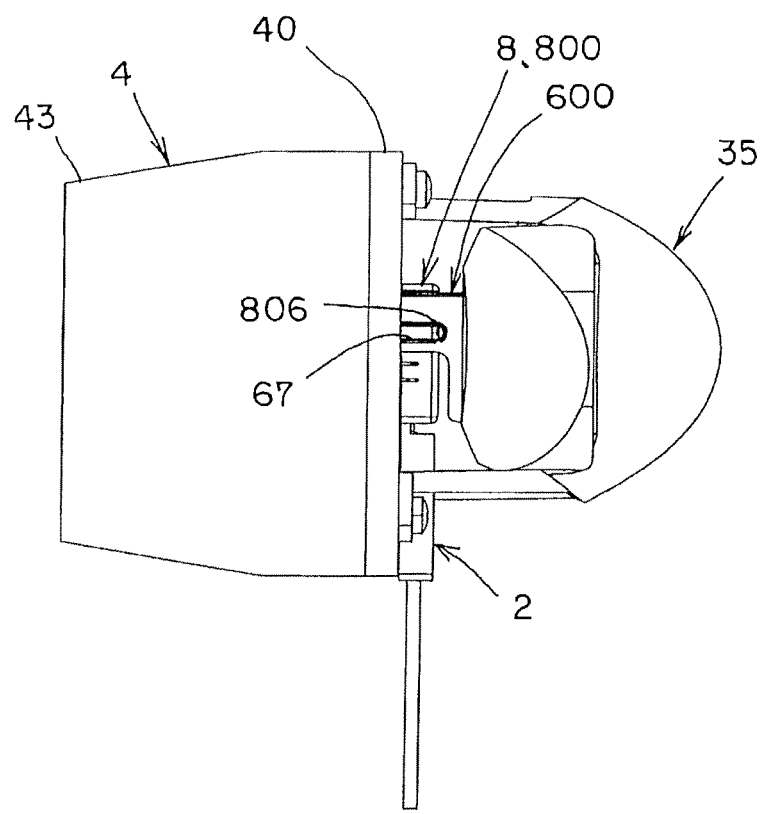
FIG. 25 shows a third embodiment of a vehicle headlamp according to the present invention, and is a side view of a left side lamp unit.
Figure 26:
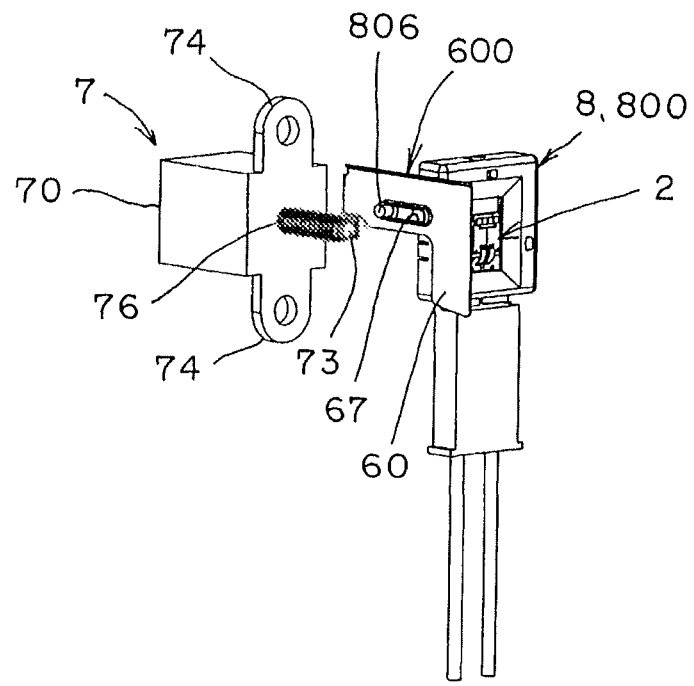
FIG. 26 is a perspective view showing the semiconductor-type light source, the light control member, a driving member, and the cover member to be seen when the light control member is positioned in a first location.
Figure 27:
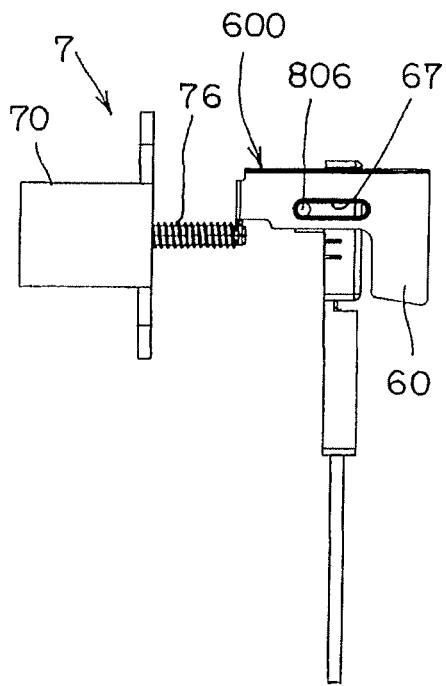
FIG. 27 is a side view showing the semiconductor-type light source, the light control member, the driving member, and the cover member to be seen when the light control member is positioned in the first location and in a second location.
Figure 27:
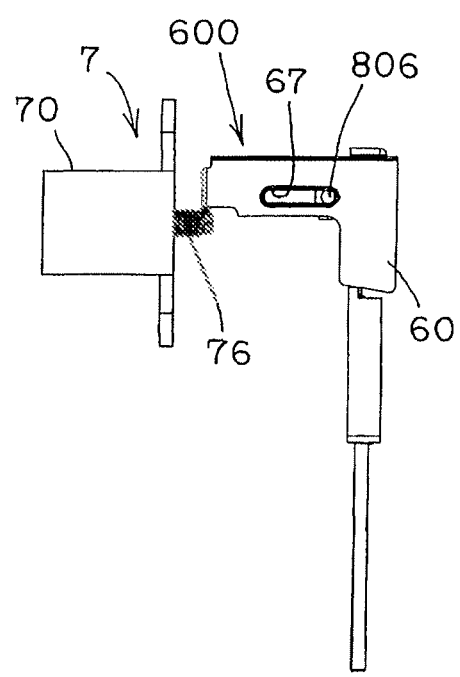

FIG. 25 to FIG. 27 each show a third embodiment of a vehicle headlamp according to the present invention. Hereinafter, the vehicle headlamp according to the third embodiment will be described. In the figures, like constituent elements shown in FIG. 1 to FIG. 24 are designated by like reference numerals.

The vehicle headlamps 1L and 1R according to the first embodiment and the vehicle headlamp according to the second embodiment, as described previously, are provided in such a manner that the light control member 6 is mounted to the cover members 8 and 800 so as to be changeably rotatable and movable between the first location and the second location, and the rotation center shaft O1 of the rotation mechanism is positioned on the opposite side of the lens 35 (on the rear side) with respect to the semiconductor-type light source 2 that is fixed to the heat sink member 4.

On the other hand, the vehicle headlamp according to the third embodiment is provided in such a manner that a light control member 600 is mounted to a respective one of the cover members 8 and 800 so as to be changeably slidably movable between a first location (refer to FIG. 27(A)) and a second location (refer to FIG. 27(B)) by means of a slide mechanism and a guide protrusive portion 806, and the guide protrusive portion 806 is positioned on an opposite side of a lens 35 (on a rear side) with respect to a semiconductor-type light source 2 that is fixed to a heat sink member 4.

The light control member 600 that is made of only a light shading portion 60 is used. A guide elongated hole 67 is provided in the light control member 600. On the other hand, the guide protrusive portion 806 is integrally provided in a respective one of the cover members 8 and 800. The guide protrusive portion 806 engages with the guide elongated hole 67, whereby the light control member 600 is mounted to a respective one of the cover members 8 and 800 in such a manner as to be changeably slidably movable between a first location and a second location. A forward/backward rod 73 of a solenoid 70 of a driving member 7 is connected to the light control member 600. In the figure, reference numeral 76 designates a spring. A spring 76, as is the case with the spring 72 mentioned previously, is provided in such a manner that when no operation is made, in other words, when the solenoid 70 is powered off, the forward/backward rod 73 is positioned in a forward location by means of a spring force of the spring 76, and the light control member 600 is positioned in the first location.

When the light control member 600 is positioned in the second location, almost all of the light shading portion 60 is housed in a housing portion (a housing groove portion or a housing recessed portion) of the heat sink member 4 (it is to be noted that a major part or a part of the light shading portion may be housed therein).

The vehicle headlamp according to the third embodiment is capable of achieving functions and advantageous effects that are substantially identical to those of the vehicle headlamps 1L and 1R according to the first embodiment and those of the vehicle headlamp according to the second embodiment as described previously. Moreover, the guide protrusive portion 806 is positioned on the opposite side of the lens 35 (on the rear side) with respect to the semiconductor-type light source 2 that is fixed to the heat sink member 4; and therefore, the light control member 600 can be switched in such a manner as to be slidably moved between the first location with a narrow gap and the second location with narrow gap. In this manner, dimensions in slide movement switching direction between the first location and the second location of a lamp unit can be reduced, and the lamp unit can be reduced in size accordingly. Moreover, the light control member 600 that is made of only the light shading portion 60 is used; and therefore, a construction of the light control member 600 is simplified, and the lamp unit can be reduced in size accordingly.

(Description of Examples Other Than the First, Second, Third Embodiments)

The first, second, and third embodiments has described the vehicle headlamps 1L and 1R in a case where the vehicle C is driven on a left side. However, the present invention can be applied to a vehicle headlamp in a case where the vehicle C is driven on a right side.

In the first, second, and third embodiments, the main lens portion 3 and the auxiliary lens portion 5 of the lens 35 are integrated with each other. However, in the present invention, the main lens portion 3 and the auxiliary lens portion 5 of the lens 35 may be separated from each other.

Further, in the first, second, and third embodiments, the auxiliary lens portion 5 is provided on a right edge (a left edge) of the main lens portion 3 on one-by-one piece basis. However, in the present invention, these auxiliary lens portions may be provided on a top edge, the left edge (the right edge), and a bottom edge of the main lens portion 3. In addition, a plurality of auxiliary lens portions may be provided. In a case where a plurality of auxiliary lens portion are provided, a light distribution pattern for front side and a light distribution pattern for overhead other than a spot light distribution pattern SP, a light distribution pattern for left side, and a light distribution pattern for right side may be formed and combined with the light distribution pattern for spot SP, the light distribution pattern for left side, and the light distribution pattern for right side.

Still furthermore, in the first, second, and third embodiments, the solenoid 70 is used as the driving member 7. However, in the present invention, a member other than the solenoid 70, for example, a motor or the like may be used as the driving member 7. In this case, a driving force transmission mechanism is provided between the motor and the light control member 6.

Yet furthermore, in the first, second, and third embodiments, the auxiliary lens portion 5 of the lens 35 is a lens portion of a full reflection type. However, in the present invention, the auxiliary lens portion of the lens 35 may be a lens portion other than the lens portion of the full reflection type, for example, a lens portion of a refraction type or a lens portion of a Fresnel refraction type.

Furthermore, in the first, second, and third embodiments, a fixing surface of another face of the vertical plate portion 40 of the heat sink member 4 is a flat surface. However, in the present invention, of the fixing surface of such another face of the vertical plate portion of the heat sink member, a fixing surface to which a semiconductor-type light source is fixed and another fixing surface may be different from each other in step.

What is claimed is:

1. A vehicle headlamp comprising:
   a semiconductor light source having a light emission surface;
   a lens configured to illuminate light from the light emission surface of the semiconductor light source forward of a vehicle, as a predetermined pattern;
   a mount member to which the semiconductor light source is fixed;
   a light control member that is disposed so as to be movable between a first location and a second location, and is configured to switch the light distribution pattern;
   a driving member configured to position the light control member so as to be changeably movable between the first location and the second location; and a cover member in which a window portion is provided in correspondence with the light emission surface of the semiconductor light source, the cover member being configured to cover a portion other than the light emission surface of the semiconductor light source, wherein the cover member is fixed to the mount member so as to be integrated with the semiconductor light source, and wherein the light control member is mounted to the cover member so as to be changeably movable between the first location and the second location, wherein the light control member comprises a light shading portion and a light transmission portion, wherein when the light control member is in the first location, the light transmission portion is positioned in a location other than between the semiconductor light source and the lens, and when the light control member is in the second location, the light transmission portion is positioned in a location between the semiconductor light source and the lens such that light from the semiconductor light source passes through the light transmission portion to the lens.

2. The vehicle headlamp according to claim 1, wherein the light control member is mounted to the cover member so as to be changeably rotatable and movable between the first location and the second location by a rotation mechanism, and wherein a rotation center shaft of the rotation mechanism is positioned on an opposite side of the lens with respect to the semiconductor light source that is fixed to the mount member.

3. The vehicle headlamp according to claim 1, wherein the light control member is mounted to the cover member so as to be changeably slidably movable between the first location and the second location by means of a slide mechanism and a guide protrusive portion, wherein the guide protrusive portion is positioned on an opposite side of the lens with respect to the semiconductor light source that is fixed to the mount member.

4. The vehicle headlamp according to claim 1, wherein the light transmission portion comprises a transparent resin.

5. The vehicle headlamp according to claim 1, wherein the lens comprises a main lens portion and an auxiliary lens portion, wherein when the light control member is in the first location, the light shading portion is positioned between the semiconductor light source and the auxiliary lens portion so as to shade light from the semiconductor light source to the auxiliary lens portion, wherein when the light control member is in the second location, the light shading portion is in a location other than between the semiconductor light source and the auxiliary lens portion.

6. The vehicle headlamp according to claim 1, wherein the light shading portion comprises an opaque resin.

* * * * *